(12) United States Patent
Exall et al.

(10) Patent No.: US 7,330,817 B1
(45) Date of Patent: Feb. 12, 2008

(54) SYSTEM AND METHODS FOR EMPLOYMENT LAW COMPLIANCE, ESTABLISHMENT, EVALUATION AND REVIEW

(75) Inventors: Marian Exall, Atlanta, GA (US); Steven S. Greene, Roswell, GA (US); Fred Rogan, Birmingham, AL (US); Victoria Helms, Atlanta, GA (US); Janet Tomko, Atlanta, GA (US); Tricia Reeks, Atlanta, GA (US); Daniel Paulk, Mableton, GA (US)

(73) Assignee: Employment Law Compliance, Inc., Atlanta, GA (US)

( * ) Notice: Subject to any disclaimer, the term of this patent is extended or adjusted under 35 U.S.C. 154(b) by 1056 days.

(21) Appl. No.: 09/929,859

(22) Filed: Aug. 13, 2001

Related U.S. Application Data

(60) Provisional application No. 60/224,836, filed on Aug. 11, 2000.

(51) Int. Cl.
*G06Q 99/00* (2006.01)
(52) U.S. Cl. .......................................................... 705/1
(58) Field of Classification Search ..................... 705/1
See application file for complete search history.

(56) References Cited

U.S. PATENT DOCUMENTS

| | | | |
|---|---|---|---|
| 5,224,173 A | 6/1993 | Kuhns et al. | |
| 5,489,213 A | 2/1996 | Makipaa | |
| 5,623,403 A | 4/1997 | Highbloom | |
| 5,745,755 A | 4/1998 | Covey | |
| 5,884,275 A | 3/1999 | Peterson et al. | |
| 6,112,188 A | 8/2000 | Hartnett | |
| 6,119,097 A | 9/2000 | Ibarra | |
| 6,122,622 A | 9/2000 | Wiitala et al. | |
| 6,157,808 A | 12/2000 | Hollingsworth | |
| 6,416,328 B1* | 7/2002 | Callahan | 434/322 |
| 6,904,412 B1* | 6/2005 | Broadbent et al. | 705/38 |
| 2001/0051906 A1* | 12/2001 | Esposito | 705/35 |
| 2002/0059093 A1* | 5/2002 | Barton et al. | 705/10 |
| 2002/0184148 A1* | 12/2002 | Kahn et al. | 705/40 |
| 2004/0010517 A1* | 1/2004 | Fetherston | 707/104.1 |

OTHER PUBLICATIONS

"Employer's Survival in the Thickening Jungle of Regulatory Mandates," PR Newswire, Apr. 24, 1997.*

(Continued)

*Primary Examiner*—Jonathan Ouellette
(74) *Attorney, Agent, or Firm*—Weatherly Kerven & Seigel LLC; David S. Kerven; Mitchell G. Weatherly

(57) ABSTRACT

The present invention is directed to systems and methods for facilitating an employer's compliance with employment laws. A typical system includes a data store for storing compliance information, a processor for supporting compliance functionality and a link to a communication channel allowing communication with one or more agents of an employer. A request to interact is received from an agent indicating a selected employment action. The agent is provided access to process documentation guiding him through a process associated with the selected employment action. The agent's interactions with the process documentation are stored. Compliance reports are generated and sent to appropriate employer agents. Some embodiments may support process documentation development and update. An education facility may be provided in some embodiments.

94 Claims, 13 Drawing Sheets

OTHER PUBLICATIONS

Compliance Pro Software information, www.getyers.com*

Meade, Jim, "Desktop Employment Law: an HR attornet in your PC." HRMagazine, Oct. 1999.*

Phin, Donald A., "Address Potential Workplace Liabilities Up Front: Educate Employees Often About Policies, and Ask Them About Problems Before They Come To You," Business Insurance, p. 16, Nov. 2, 1998.*

Heckman & Roetter, "Designing Government Agents for Constitutional Compliance," Proceedings of the Third Annual Conference on Autonomous Agents, pp. 299-305, May 1-5, 1999.

Johnson & Mead, "Legislative Knowledge Base Systems for Public Administration: Som Practical Issues," Proc. of the 3d Internat'l Conf. on AI & Law, pp. 108-117, Jun. 25-28, 1991.

King & Stanley, "Ensuring Court Admissibility of Computer-Generated Records," ACM Transactions on Information Systems, vol. 3, Issue 4, pp. 398-412, Oct. 1985.

Matthijssen, "An Intelligent Interface for Legal Databases," Proceedings of Fifth Internat'l Conf. on AI & Law, pp. 71-80, May 21-24, 1995.

Morris, et al. "Handling of Significant Deviations from Boilerplate Text," Proceedings of the First Internat'l Conf. on AI & Law, pp. 145-154, May 27-29, 1987.

Heckman and Roetter, "Designing Government Agents for Constitutional Compliance," *Proceedings of the Third Annual Conference on Autonomous Agents*, pp. 299-305, May 1-5, 1999, Seattle, WA USA.

Johnson and Mead, "Legislative Knowledge Base Systems for Public Administration: Some Practical Issues," *Proceedings of the Third International Conference on Artificial Intelligence & Law*, pp. 108-117, Jun. 25-28, 1991, Oxford, United Kingdom.

King and Stanley, "Ensuring Court Admissibility of Computer-Generated Records" *ACM Transactions on Information Systems*, vol. 3, Issue 4, pp. 398-412 (Oct. 1985).

Matthijssen, "An Intelligent Interface for Legal Databases," *Proceedings of the Fifth International Conference on Artifical Intelligence and Law*, pp. 71-80, May 21-24, 1995, College Park, MD, USA.

Morris, et al. "Handling of Significant Deviations from Boilerplate Text," *Proceedings of the First International Conference on Artificial Intelligence and Law*, pp. 145-154, May 27-29, 1987, Boston, MA USA.

* cited by examiner

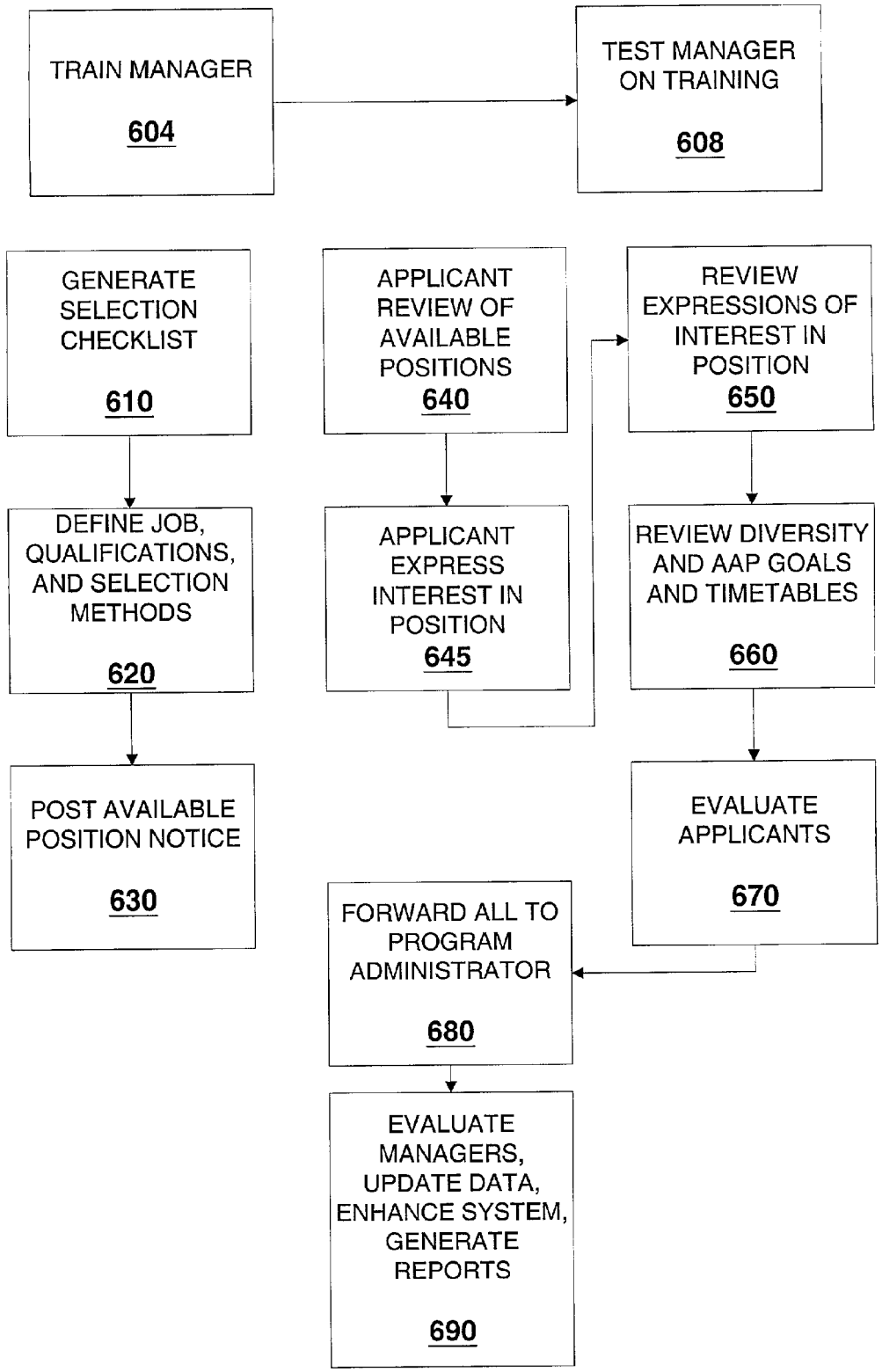

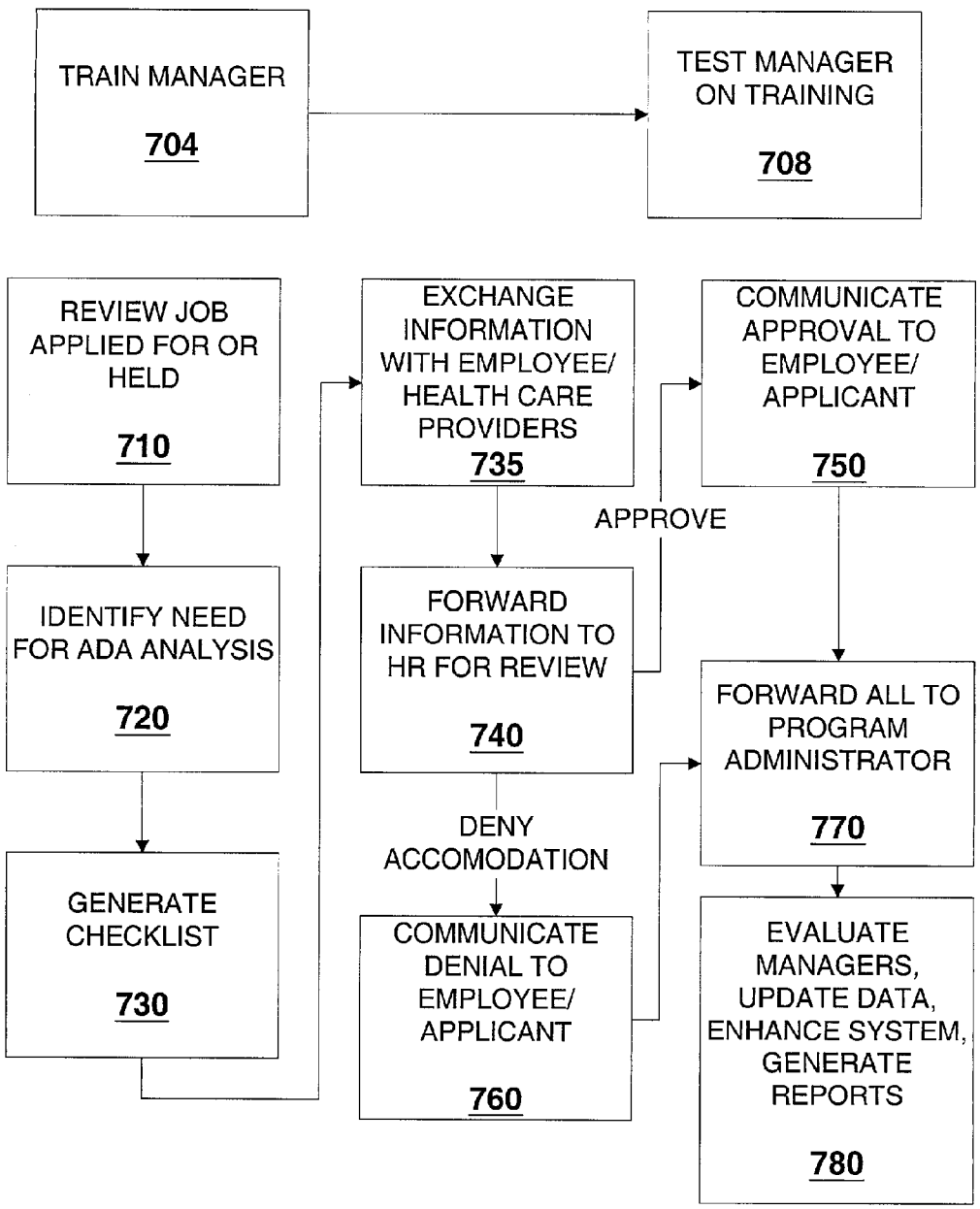

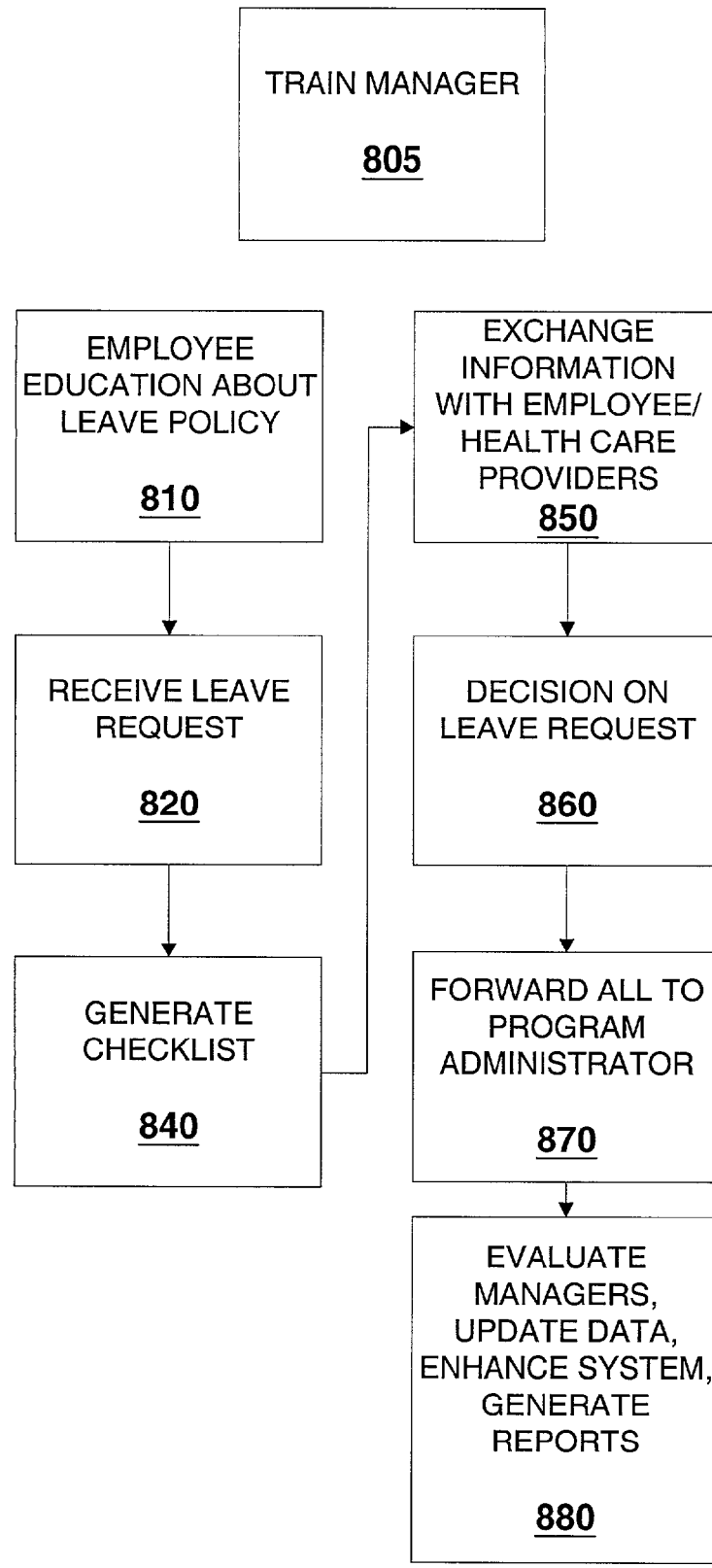

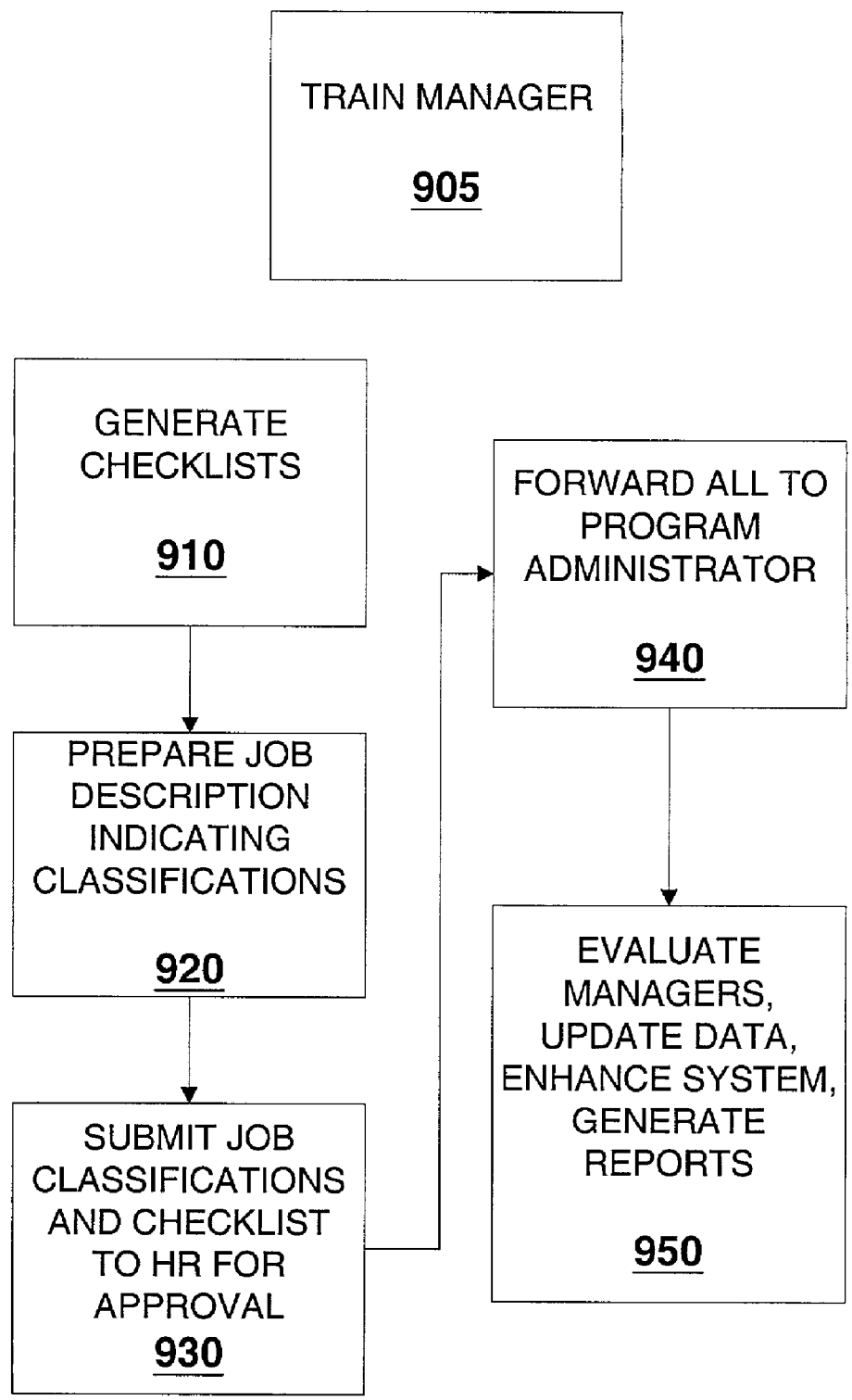

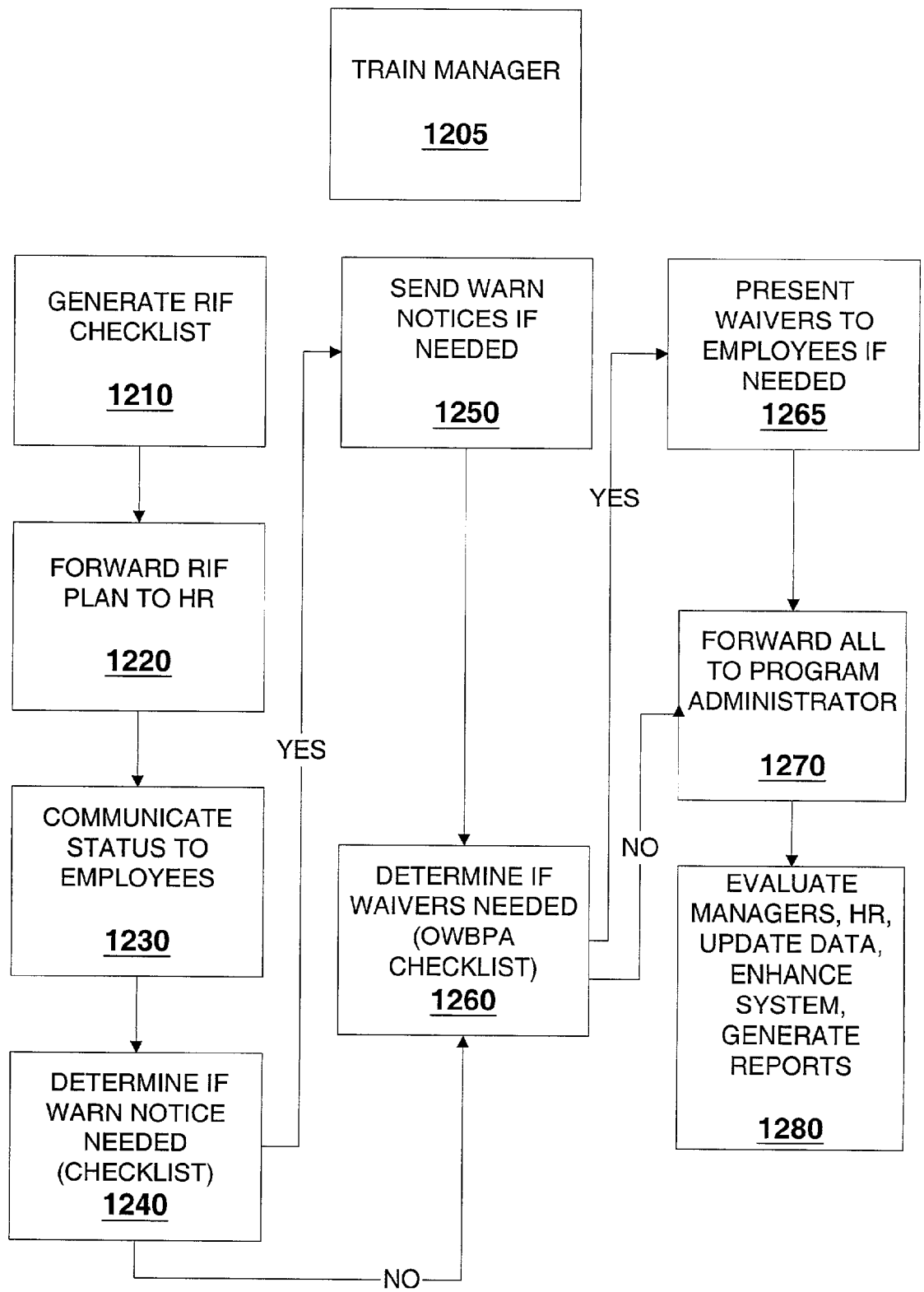

SYSTEM AND METHODS FOR EMPLOYMENT LAW COMPLIANCE, ESTABLISHMENT, EVALUATION AND REVIEW

CROSS-REFERENCE TO RELATED PATENT APPLICATION

This application claims the benefit, pursuant to 35 U.S.C. §119(e), of applicants' provisional U.S. Patent Application Ser. No. 60/224,836, filed Aug. 11, 2000, entitled "SYSTEM AND METHOD FOR EMPLOYMENT LAW COMPLIANCE ESTABLISHMENT, EVALUATION AND REVIEW", which application is hereby incorporated by this reference in its entirety for all purposes.

BACKGROUND OF INVENTION

1. Field of Invention

The present invention is directed to systems and methods for facilitating an employer's compliance with employment laws having varying requirements. More specifically, without limitation, the present invention relates to computer-based systems and methods for use by an employer through its agents in facilitating, reviewing, evaluation and/or establishing compliance with employment laws.

2. Description of Related Art

The Internet is a global network of connected computer networks. Over the last several years, the Internet has grown in significant measure. A large number of computers on the Internet provide information in various forms. Anyone with a computer connected to the Internet can potentially tap into this vast pool of information.

The most wide spread method of providing information over the Internet is via the World Wide Web (the Web). The Web consists of a subset of the computers connected to the Internet; the computers in this subset run Hypertext Transfer Protocol (HTTP) servers (Web servers). The information available via the Internet also encompasses information available via other types of information servers such as GOPHER, WAIS, SMTP (simple mail transfer protocol), POP3 (Post Office Protocol) and FTP (file transfer protocol).

Information on the Internet can be accessed through the use of a Uniform Resource Locator (URL). A URL uniquely specifies the location of a particular piece of information on the Internet. A URL will typically be composed of several components. The first component typically designates the protocol by which the address piece of information is accessed (e.g., HTTP, GOPHER, etc.). This first component is separated from the remainder of the URL by a colon (':'). The remainder of the URL will depend upon the protocol component. Typically, the remainder designates a computer on the Internet by name, or by IP number, as well as a more specific designation of the location of the resource on the designated computer. For instance, a typical URL for an HTTP resource might be:

http://www.server.com/dir1/dir2/resource.htm where http is the protocol, www.server.com is the designated computer and /dir1/dir2/resouce.htm designates the location of the resource on the designated computer.

Web servers host information in the form of Web pages; collectively the server and the information hosted are referred to as a Web site. A significant number of Web pages are encoded using the Hypertext Markup Language (HTML) although other encodings using the eXtensible Markup Language (XML) or the Standard Generic Markup Language (SGML) are becoming increasingly more common. The published specifications for these languages are incorporated by reference herein. Web pages in these formatting languages may include links to other Web pages on the same Web site or another. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

The foregoing information regarding the Internet and World Wide Web is provided as background with respect to Web-based embodiments of the present invention. As such, the present invention is not necessarily limited to such embodiments but may encompass other delivery vehicles/communication channels now known or subsequently discovered as further described below.

Computer and telecommunications technologies provide an unprecedented ability to custom tailor content to the demands of particular users. Computerized environments have been developed to aid in compliance with legal requirements such as compliance with registration and taxation requirements (see, e.g., U.S. Pat. No. 5,623,403 to Highbloom) and chemical control laws (see, e.g., U.S. Pat. No. 6,122,622 to Wiitala et al.). The present invention utilizes these technologies to create, manage and deliver content, particularly materials, often interactive, to facilitate compliance with employment laws.

Employers are subject to a wide variety of laws governing workplace behavior and the employment relationship. In the United States, for example, such laws include at the federal level: Title VII of the Civil Rights Act of 1964 (Title VII), The Age Discrimination in Employment Act (ADEA), The Americans with Disabilities Act (ADA), The Fair Labor Standards Act (FLSA), The Family and Medical Leave Act (FMLA), The Occupational Safety and Health Act (OSHA), the Worker Adjustment and Retraining Notification Act (WARN), and the Older Workers Benefit and Protection Act (OWBPA).

Title VII—Prohibits discrimination in employment on the basis of race, color, sex (including pregnancy), national origin or religion. "Discrimination" includes harassment on these bases. Title VII also prohibits retaliation against employees who make a complaint or participate in a proceeding covered by Title VII.

ADEA—Prohibits discrimination on the basis of age. Also prohibits harassment and retaliation (see Title VII).

ADA—Prohibits discrimination in employment on the basis of disability. Employers have an obligation to provide a reasonable accommodation to disabled applicants or employees.

FLSA—Requires employers to pay employees a minimum hourly wage and to pay time and a half the regular hourly rate for hours worked in excess of forty per week. There are limited exemptions to these requirements for so-called "white collar" workers and other specific types of jobs.

FMLA—Gives job protection to eligible employees who take leave because of their own or a close family member's serious medical condition, or for the birth or placement by adoption of a child.

OSHA—Imposes a duty on employers to maintain a safe workplace.

WARN—Requires employers to give workers 60 days' notice of a plant closing or mass layoff resulting in at least a certain specified number of employment losses.

OWBPA—Requires waivers of claims obtained from employees over 40 to conform to certain requirements regarding content, and time for consideration and revocation.

Over the last twenty years the number and complexity of employment laws has increased, and the task of translating these changing legal standards into practice has become more difficult. At the same time, the risks of non-compliance have grown. The number of employment-related lawsuits and the size and frequency of awards to plaintiffs have increased tremendously, especially in the United States, presenting not only substantial financial exposure, but also the risk of adverse public reaction, and worsened employee relations. Even when an employer avoids litigation, it pays a high price for failing to attract and retain the best employees. Finally, employers face an enormous administrative challenge in maintaining the appropriate records to demonstrate compliance.

Employers currently look to a variety of sources in meeting the employment compliance challenge. They may turn to outside attorneys or human resources consultants. The high cost of outside counsel and consultants often means assistance is not sought until after non-compliance has caused a problem. Moreover, the hourly billing model most often employed encourages the expensive re-creation of a "unique" solution each time for each client.

Training has long been acknowledged as an important tool in assuring legal compliance. However, classroom training is expensive, disruptive, and often ineffective in changing behavior. The cost of developing an in-house training program is high, and the necessary expertise may not be available. With the technological advances described above, e-learning companies have emerged, offering computerized training modules on a limited range of employment compliance topics. However, these programs are not usually tailored to the needs and characteristics of a particular employer, and may not be current with the latest legal developments. In any event, training alone, no matter how good the content or efficient the means of delivery, has limited effect in ensuring and tracking compliance on a day-to-day basis.

In contrast to either ad hoc compliance advice from outside consultants or occasional compliance training (classroom or computer), the present invention presents the appropriate employment law compliance information to employees, managers and human resources professionals at the appropriate time. The invention guides managers and human resources professionals in making employment decisions and taking employment actions, as the events requiring a compliant response actually occur. The appropriate manager or HR professional then, through a series of interactions with the computer, is led step-by-step to take legally compliant action. The present invention allows for updating the content promptly to reflect legal or business developments. Finally, the invention allows a complete record of activity to be maintained, to enable the employer to evaluate results, and to demonstrate compliance, if an employment action is later challenged. Through computer technology, the present invention thus offers a cost-effective way to ensure employment compliance consistently throughout an organization.

SUMMARY OF THE INVENTION

The present invention is directed to systems and methods for facilitating an employer's compliance with employment laws having varying requirements. Further, the systems and methods according to the present invention may aide in reviewing, evaluation and/or establishing such compliance. More specifically, the present invention is directed to computer-based systems and methods for use by an employer for guiding its agents (employees, human resources and other managers) through process best suited to promote compliance with existing employment laws. The systems and methods in some embodiments may provide timely employment law compliance education to agents, including statements of employment policies and procedures and training modules. The systems and methods may also provide mechanisms and procedures for updating employment law compliance content as requirements change. Additionally, the systems and methods may provide tracking, recording and reporting on employment law compliance.

A typical environment according to the present invention includes a system data store, a system processor and a link to a communication channel allowing communication with one or more user output devices. The system data store stores data needed to provide the desired system functionality and may include compliance information in the form of monitored interactions, agent information, employer information and process documentation (content). The system data store may include multiple physical and/or logical data stores for storing the various types of information. Data storage and retrieval functionality may be provided by either the system processor or data storage processors associated with the data store. The system processor is in communication with the system data store via any suitable communication channel(s); the system processor is in communication with the link via the same, or differing, communication channel(s). The system processor will typically include one or more processing elements that provide access, monitoring, updating, tracking, training, reporting and/or other functionality.

Accordingly, a method of facilitating compliance and reporting typically includes a variety of steps that may, in certain embodiments, be executed by the typical environment summarized above and more fully described below or be stored as computer executable instructions in and/or on any suitable combination of computer-readable media. In some embodiments, a request to interact is received from an agent of an employer. The request will at least include an indication of a selected employment action. The agent is then provided access to process documentation that guides the agent through a process, designed to minimize non-compliance with employment laws, supporting the selected employment action. The agent's interactions with the process documentation are stored in a data store. One or more compliance reports are generated from the stored interactions. Such reports may be generated at periodic intervals, upon demand and/or in response to some triggering event. The generated one or more reports are sent to one or more report agents of the employer. In some embodiments, the reports are generated in a manner, and into a form, suitable for admission into evidence in a legal proceeding.

Some embodiments may also support process and/or process documentation creation and update. A set of employment actions impacting employment law compliance is created initially. A process designed to minimize non-compliance is created for each employment action; process documentation associated with each created process may also be developed. The created set of employment actions and the developed process documentation are stored in a data store. The employment actions, processes and documentation may be reviewed and updated at periodic intervals or as needed based upon developments in employment laws, human resources best practices, or the employer's business environment.

An education facility may also be provided according to the present invention. Employment law sensitivity materials such as employer policy statements and training materials are provided to designated agents of the employer. Interactions of the designated agents are monitored and stored.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 6 is a flow chart of example process for employee selection.

FIG. 7 is a flow chart of example process for performing ADA analysis.

FIG. 8 is a flow chart of example process for performing FMLA management.

FIG. 9 is a flow chart of example process for analyzing job classification.

FIG. 12 is a flow chart of example process for performing a reduction in force.

DETAILED DESCRIPTION OF THE INVENTION

Figure 1:
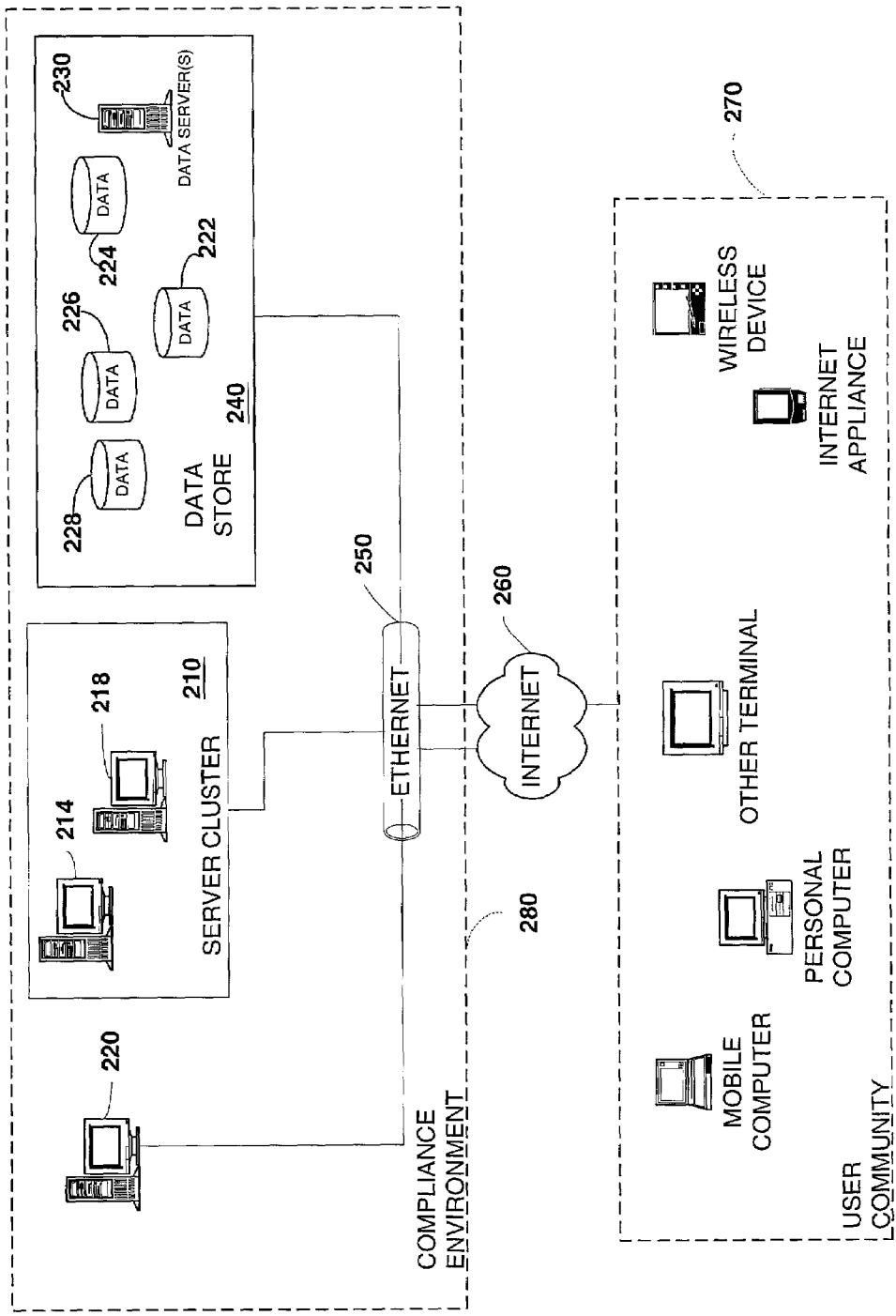
FIG. 1 is a diagram of an architecture for a typical system according to the present invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Architecture of a Typical Environment

FIG. 1 depicts a typical environment according to the present invention. Members of the user community using suitable devices 270 can interact with the compliance environment 280 via a communications channel such as the Internet 260. A typical compliance environment 280 will include a cluster of servers 210 including one or more servers 214, 218 supporting various employment law compliance functionality which, in some embodiments, may include guided decision making, training, tracking usage and report generation, as described more fully below. The compliance environment may include a separate system data store 240 for storing data associated with compliance, training, tracking, employers and agents of employers. A data store, in a typical embodiment, may be implemented as a database system using one or more servers 230 with one or more internal or external data repository 240, as described more fully below.

The compliance environment 280 will also typically include a communication channel such as Ethernet 250 supporting communication among components of the environment 280. The compliance environment 280 may also optionally include one or more load-balancing devices 220, typically server systems, for distributing work among the components of the environment 280.

The compliance environment 280 may include a server cluster 210 of one or more servers (e.g. 214, 218) that provides environment functionality. These, or other servers (not shown), may support access to the environment by members of the user community 270. Access to the environment by these various users may be via any suitable communication channel, which in a typical embodiment will be a computer network such as the Internet 260 and/or Ethernet 250. In other environments, access may be via other forms of computer network, direct dial-up connection, dedicated connection, direct or indirect connection such as via a bus connection, parallel or serial connection, null modem connection or wireless connection utilizing an appropriate communication protocol such as BLUETOOTH, IRDA, 802.11b or other suitable channel as would be known to those skilled in the art. Some embodiments may use and/or require a combination of communication vehicles, such as those previously described, to serve as the communication channel. In some embodiments the access channel may provide security features, either session-based and/or layer-based; for instance, a secure socket layer (SSL) may be used with respect to an embodiment using the Internet 260 as the access communication channel. The one or more servers of the server cluster 210 may include or connect to a data store 240.

The conveyance of information to and from the user of the environment occurs via a link, or interface, to or with a suitable communication channel for conveying the information. The link will depend upon the environment implementation and the communication channel, or the first portion thereof where the communication channel is composed of several portions of potentially varying types. Depending upon the characteristic of the link, the link may allow selective communication with one or more user computers. In most cases, the environment communicates information to the user through a processor such as a computer, which may, in certain embodiments, provide server functionality, and be part of a server cluster; where the source of the communication is a processor, the link may be a wired or wireless modem, a serial or parallel interface, a network interface, a bus interface or combinations thereof where communication may occur via multiple communication channels or where differing types of communication occur through potentially different channels. The communication channel usually consists of one or more of the following types of channels: computer network, direct serial or parallel connection, dial-up connection, dedicated line connection, wireless connection, bus connection and combinations thereof. The communication channel may further consist of a variety of computer network types including an Ethernet, a token ring network, the Internet and/or combinations thereof. Communication may use any suitable protocol; however, in most instances, the protocol selected will depend upon the communication channel. Typically, the protocol is one or more of the following protocols alone, or in combination where multiple types of channels form portions of the communication channel: HTTP, HTTPS, SMTP, FTP, GOPHER, and WAIS as layer 3 protocols and/or TCP/IP, IPX, NETBEUI, 802.11b, BLUETOOTH as layer 2 protocols and/or interprocess communication such as RPC, DCE, IIOP, COM, etc.

The various components of the environment 280 may communicate with each other through any suitable communication architecture including, but not limited to, a computer network such as a Ethernet 250, token ring network or the Internet 260; a direct connection such as a bus connection, parallel or serial connection, null modem connection, dedicated line or wireless connection utilizing an appropriate communication protocol such as BLUETOOTH; a dial-up connection; and appropriate combinations thereof. In embodiments where a single computer may provide all functional components, the communication may occur via bus connections, inter-process communication, shared files or some combination of these methods or other commonly used single-computer communication mechanisms.

The architecture, seen in FIG. 1, uses the Internet 260 and an Ethernet 250 as communication channels allowing access to the environment by various members of the user community 270. The environment uses a computer network such as the depicted Ethernet 250 to allow communication among the components of the environment; a router (not shown) may be included in the environment to manage such communication within the internal network as well as managing the interface between the internal network and the Internet 260. The functionality of the environment may be spread among a server cluster 210, a data store 240 and, in some embodiments, a load-balancing device 220. Where a load-balancing device 220 is present, the device may be responsible for allocating and managing distribution of access among various elements within the server cluster 210 and/or the data store 230. Users may access the environment through standard Web browser software or via specialized access software adapted for interfacing with the compliance environment 280.

The server cluster 210 provides the desired functionality of the environment 280. In some embodiments, the server cluster 210 may be divided into access servers and application servers where the access servers provide electronic access functionality such as by electronic mail server(s) and/or Web server(s) and the application servers provide the desired curriculum functionality. In some such embodiments, the one or more servers (e.g. 214, 218) in the server cluster 210 may be supported via Intel-compatible hardware platforms preferably using at least a PENTIUM III (Intel Corp., Santa Clara, Calif.) or UltraSPARC (Sun Microsystems, Palo Alto, Calif.) class processor. In some embodiments, curriculum and/or access functionality, as further described below, may be distributed across multiple processing elements. The term processing element may be a process running on a particular piece, or across particular pieces, of hardware, a particular piece of hardware or either as the context allows. The hardware platform would have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant).

Depending upon the hardware/operating system platform, appropriate server software may be included to support the desired application, email and Web server functionality. The Web server functionality may be provided via an Internet Information Server (Microsoft, Redmond, Wash.), an Apache HTTP Server (Apache Software Foundation, Forest Hill, Md.), an iPlanet Web Server (iPlanet E-Commerce Solutions—A Sun—Netscape Alliance, Mountain View, Calif.) or other suitable Web server platform. The email services may be supported via an Exchange Server (Microsoft, Redmond, Wash.), sendmail or other suitable email server. Some embodiments may include one or more automated voice response (AVR) systems that are in addition to, or instead of, the aforementioned access servers. Such an AVR system could support a purely voice/telephone driven interface to the environment with hard copy output delivered electronically to suitable hard copy output device (e.g., printer, facsimile, etc.), and forward as necessary through regular mail, courier, inter-office mail, facsimile or other suitable forwarding approach.

Application servers in some embodiments may be iPlanet Application Servers (iPlanet E-Commerce Solutions—A Sun—Netscape Alliance, Mountain View, Calif.), WebSphere Servers (International Business Machines, Armonk, N.Y.), Tomcat Java Servlet/JSP Engine (Apache Software Foundation, Forest Hill, Md.), or WebLogic Application Server (BEA Systems, Inc., San Jose, Calif.). In some embodiments, the application services may be provided through programmed pages on the Web server; such pages may use ASP (Microsoft, Redmond, Wash.), ColdFusion (Macromedia, San Francisco, Calif.), Java Servlet (Sun Microsystems, Palo Alto, Calif.) or other suitable technologies to provide server side logic and may use ActiveX (Microsoft, Redmond, Wash.), VBScript (Microsoft, Redmond, Wash.), JavaScript/ECMAScript (ECMA, Geneva, Switzerland) or other suitable technologies to support client side logic.

The data store 240 provides for the storage and, potentially, the management of the data required by the environment. A typical data store 240 will include one or more storage devices (e.g. 222, 224, 226 & 228), and in some embodiments, may include one or more data servers 230 to receive and service data requests. The data store depicted in FIG. 1 uses a server 230 and several external data repository 222, 224, 226 & 228. These depictions are representative only, and consequently, other data store architectures may have single, multiple and/or varied servers and storage elements. For example, the system data store may use internal storage devices connected to one or more of the server processors (214, 218) of the server cluster 210. In embodiments where a single processor supports all functionality of the environment, a local hard disk drive may serve as the system data store, and a disk operating system executing on the single processor acting as a data server may support receive and service data requests.

Figure 2:
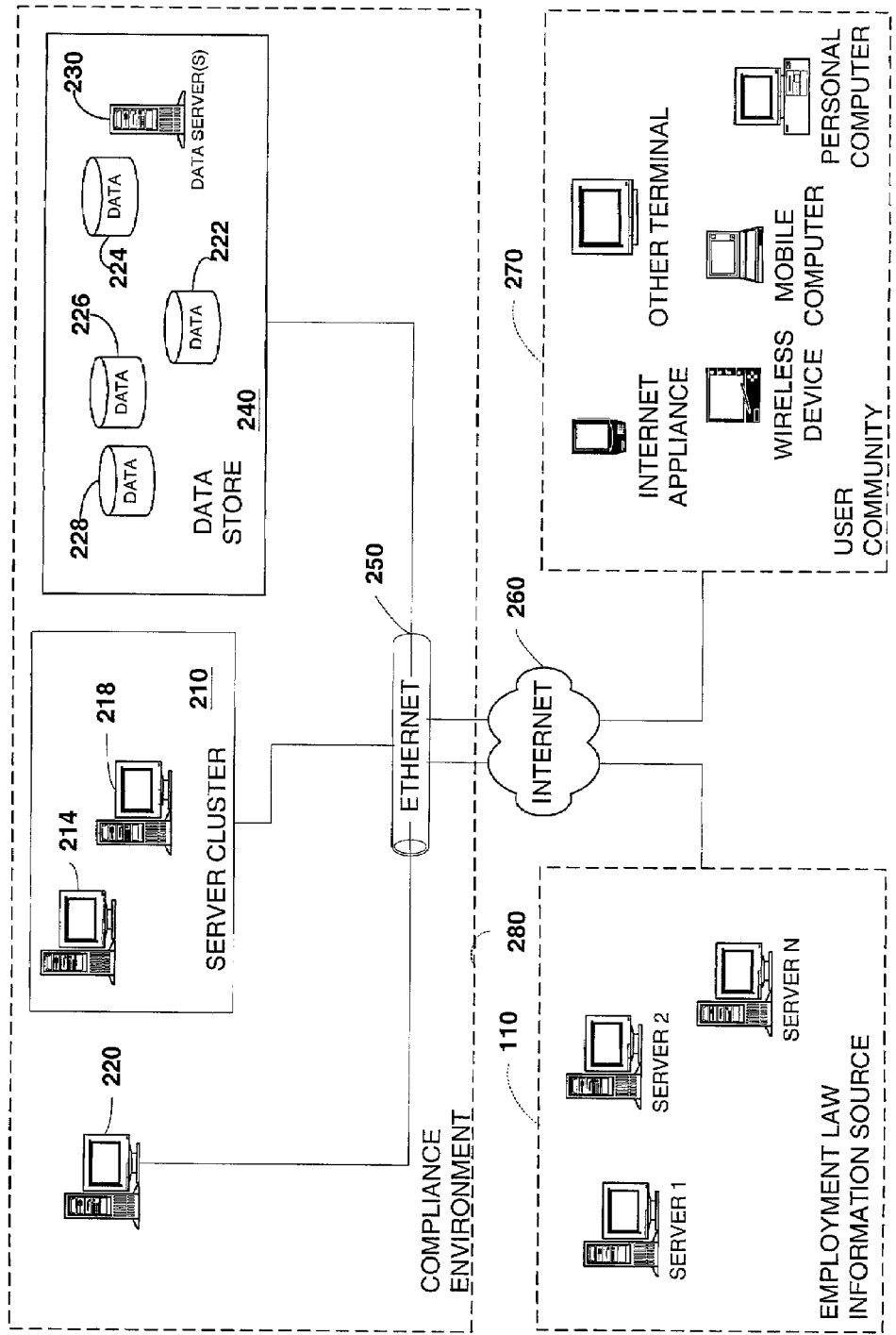
FIG. 2 is a diagram of an architecture for another embodiment of the present invention.

Information concerning different users (including administrators, content developers, agents of employers (i.e., employees, human resources personnel, managers, etc.)), employers using the environment, content supporting decision making including process documentation, policy dissemination and training functionality, and records tracking environment usage may be stored in the data store 240. In some embodiments, content supporting decision making, policy dissemination and training, or portions thereof, may be developed, provided and maintained by a third-party employment information source. In such embodiments, this content may be stored in data store 240, and possibly updated on a periodic basis, as required by changes in law, upon demand or as determined by the employment information source. In other such embodiments, the content may be stored remotely as depicted in FIG. 2 where one or more employment law information sources provided content as needed by the environment 280 via a suitable communication channel such as Internet 260. Typically, this information may be provided via one or more server computers 110 associated with the one or more employment law information sources. The environment 280 may in certain instances cache such content in the data store 240, or always work purely as a pass through either by redirecting the user directly to such employment law information servers 110 or by retrieving content from such employment law information servers 110 and in turn passing the content directly to the user. The various types of content discussed above may be available in any suitable format such as HTML, XML, SGML, PDF (Adobe Systems Inc., San Jose, Calif.), VRML, PostScript, Encapsulated Postscript, text, TIFF, GIF, CFM (Cold Fusion), ASP (Active Server Pages), etc. and may include other embedded active components such as HTML forms, JavaScript routines, Java applets, etc.

It will be understood by those of skill in the art that these different types of information may be logically or physically segregated within a single system data store; multiple related data stores accessible through a unified management system, which together serve as the system data store; or multiple independent data stores individually accessible through disparate management systems, which may in some embodiments be collectively viewed as the system data store. The various storage elements that comprise the physical architecture of the system data store may be centrally located, or distributed across a variety of diverse locations.

The architecture of the data store 240 may vary significantly in different embodiments. In several embodiments, database(s) are used to store and manipulate the data; in some such embodiment, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), or Adaptive Server Enterprise (Sybase Inc., Emeryville, Calif.), in connection with a variety of storage devices/file servers that may include, in some embodiments, an tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof. In other embodiments, the data store may use database systems with other architectures such as object-oriented, spatial, object-relational or hierarchical or may use other storage implementations such as hash tables or flat files or combinations of such architectures. Such alternative approaches may use data servers other than database management systems such as a hash table look-up server, procedure and/or process and/or a flat file retrieval server, procedure and/or process.

Following is a typical database design for an embodiment that utilizes a relational database management system such as SQL Server.

The employer, user and roles tables could be used for controlling access to the system and to content, training, and checklists in the system. Roles such as Employee, HR Manager, Manager, and Program Administrator could be established in the roles table and assigned to various users.

| Employer Table | | | | | | |
|---|---|---|---|---|---|---|
| Field 1 | Field 2 | Field 3 | Field 4 | Field 5 | Field 6 | ... Field N |
| Employer ID | Employer Name | Address 1 | Address 2 | City | State | ... [Field N] |

| User Table | | | | | | | |
|---|---|---|---|---|---|---|---|
| Field 1 | Field 2 | Field 3 | Field 4 | Field 5 | Field 7 | Field 8 | ... Field N |
| User ID | Employer Id | Username | Password | First Name | Last Name | Role ID | ... [Field N] |

| Roles Table | | | | | | |
|---|---|---|---|---|---|---|
| Field 1 | Field 2 | Field 3 | Field 4 | Field 5 | Field 6 | ... Field N |
| Role ID | Role Name | Role Desc. | Permission 1 | Permission 2 | Permission 3 | Permission N |

The content table could be used for storage of employment law content (such as employment policies, training modules, etc.).

| Content Table | | | | | |
|---|---|---|---|---|---|
| Field 1 | Field 2 | Field 3 | Field 4 | Field 5 | ...Field N |
| Content ID | Content Type | Content Name | Content Description | Content | ...Permission N |

The following checklist tables could be used for implementation of the Complaint Investigation, Selection, Performance Evaluation, Corrective Action, ADA Analysis, FMLA Management, Workplace Violence Prevention, Job-Classification, Reduction in Force, WARN, and OWBPA Waiver interactive checklists and for storage of results as part of the compliance data store. Each checklist could be defined in the definition table with the checklist items in a related items table. So for example, the checklist for Complaint Investigation may have a checklist item that asks whether there were witnesses to the incident and the item type would be a "Y/N question". If the answer was "Y", another checklist could be "triggered" through the trigger item id that would prompt the user to identify the witnesses.

Checklist Definition Table

| Field 1 | Field 2 | Field 3 | Field 4 | Field 5 | ...Field N |
|---|---|---|---|---|---|
| Checklist ID | Checklist Name | Checklist Description | Performed By Role | Reviewed By Role | ...[Field N] |

Checklist Items Table

| Field 1 | Field 2 | Field 3 | Field 4 | Field 5 | Field 7 | ...Field N |
|---|---|---|---|---|---|---|
| Checklist ID | Item ID | Item Description | Item Type | Parent Item ID | Trigger Item ID | ...[Field N] |

Checklist Results Table

| Field 1 | Field 2 | Field 3 | Field 4 | Field 5 | Field 6 | ...Field N |
|---|---|---|---|---|---|---|
| Checklist ID | Date | Performed By | Reviewed By | Item 1 Result | Item 2 Result | ...Item N Result |

The Notifications Table could be used in conjunction with other tables, such as checklists, complaints, available positions, expressions of interest, and threat of violence reports to distribute data through the system to various users for review and/or action. So for example, if a user wants to express interest in an available position, a notification could be sent to the hiring manager by linking the expression of interest to the notification using the Link Table and Link ID fields.

Notifications Table

| Field 1 | Field 2 | Field 3 | Field 4 | Field 5 | Field 6 | Field 7 | ...Field N |
|---|---|---|---|---|---|---|---|
| Notification ID | Date | To | From | Subject | Link Table | Link ID | ...[Field N] |

Complaints Table

| Field 1 | Field 2 | Field 3 | Field 4 | Field 5 | ...Field N |
|---|---|---|---|---|---|
| Complaint ID | User ID | Date of Complaint | Date of Incident | Type of Complaint | ...[Field N] |

Available Positions Table

| Field 1 | Field 2 | Field 3 | Field 4 | ...Field N |
|---|---|---|---|---|
| Job Posting ID | Job Description ID | Hiring Manager | Date Posted | ...[Field N] |

Job Descriptions Table

| Field 1 | Field 2 | Field 3 | Field 4 | Field 5 | ...Field N |
|---|---|---|---|---|---|
| Description ID | Position Name | Description | Requirement 1 | Req. 2 | ...Req. N |

Expressions of Interest Table

| Field 1 | Field 2 | Field 3 | Field 4 | ...Field N |
|---|---|---|---|---|
| Expression ID | Job Posting ID | User ID | Date | ...[Field N] |

Threat of Violence Reports Table

| Field 1 | Field 2 | Field 3 | Field 4 | Field 5 | ...Field N |
|---|---|---|---|---|---|
| Threat ID | User ID | Date of Notification | Date of Incident | Employee Making Threat | ...[Field N] |

The training tables could be used to implement the e-training modules and for storage of results as part of the compliance data store,

Training Module Definition Table

| Field 1 | Field 2 | Field 3 | ...Field N |
|---|---|---|---|
| Module ID | Module Name | Module Description | ...[Field N] |

Training Section Definition Table

| Field 1 | Field 2 | Field 3 | Field 4 | ...Field N |
|---|---|---|---|---|
| Module ID | Section ID | Section Name | Section Order | ...[Field N] |

Training Content Table

| Field 1 | Field 2 | Field 3 | ...Field N |
|---|---|---|---|
| Section ID | Content | Content Order | ...[Field N] |

Training Test Table

| Field 1 | Field 2 | Field 3 | Field 4 | Field 5 | Field 6 | ... | Field N |
|---|---|---|---|---|---|---|---|
| Module ID | Section ID | Question | Type | Answer | Question Order | ... | [Field N] |

Training Test Results Table

| Field 1 | Field 2 | Field 3 | Field 4 | Field 5 | ... | Field N |
|---|---|---|---|---|---|---|
| Module ID | User ID | Date Attempted | Results | Attempt # | ... | [Field N] |

Various methods and functions as exhibited in various embodiments according to the present invention are described below with respect to employment law compliance functionality including guided decision making, policy and procedure dissemination, education, tracking, interactions and reporting. In some embodiments, one or more processors within architectures of the environments as described above may execute the steps in such methods and provide such functionality. The functionality may spread across multiple processing elements; in certain embodiments, these processing elements may logically and/or physically be divided into access, compliance logic and data storage processing elements where functionality is allocated appropriately among such processing elements. In other embodiments, any suitable computer readable storage device, including primary storage such as RAM, ROM, cache memory, etc. or secondary storage such as magnetic media including fixed and removable disks and tapes; optical media including fixed and removable disks whether read-only or read-write; paper media including punch cards and paper tape; or other secondary storage as would be known to those skilled in the art, may store instruction that upon execution by one or more processors cause the one or more processors to execute the steps in such methods and to provide such functionality.

Employment Law Compliance, Evaluation, Review and Establishment

Figure 3:
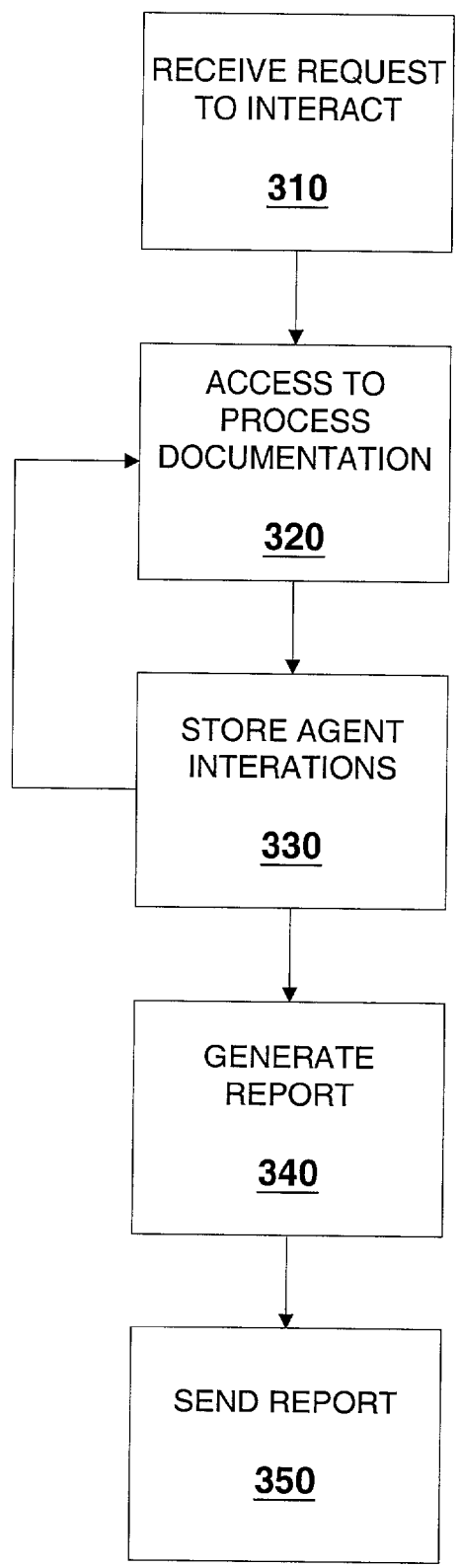
FIG. 3 is a flow chart of steps in a typical process according to the present invention.

FIG. 3 is a flow chart depicting the steps in a typical method according to the present invention. In step 310, a request to interact is received from an agent of an employer. The request includes an indicator of a selected employment action. The request may be originated in a variety of ways. For instance, any of the following approaches might be used to generate a suitable request:

1. entering an appropriate URL into a conventional browser;
2. triggering an appropriately defined ink in a web page;
3. accessing the environment by a particular agent (particular agent is only authorized to use one employment action);
4. selecting an employment action from a provided employment action selection interface, such an interface could be provided in several ways, including:
    a. communicating an AVR menu and generating the request from the response,
    b. transmitting a web page with appropriately configured links associated with employment actions, and
    c. transmitting an active server page or interactive web page (including, for example, an HTML form, a Java applet, or Javascript) to drive an employment action menu; and
5. configuring a human resources program to generate a suitable request such as by having the human resource program invoke a conventional browser with an appropriately specified URL.

Those skilled in the art will readily appreciate that a special purpose application could be developed to interact with the systems according to the present invention wherever use of a conventional browser is described above or hereinafter.

The selected employment action is a member of a defined set of employment actions potentially impacting employment law compliance. Some embodiments of the present invention involve initially creating this defined set based upon employment laws. In addition, associated with each such action in the set, a process is designed to minimize the risk of noncompliance. Documentation that guides an appropriate agent through the designed processes is also developed. The defined set and the process documentation are stored in a data store. Typically, this development process involves a review of employment laws for requirements and development of the set of employment actions, processes and process documentation based on the requirements from the review. These developed materials are subject to change as employment laws and cases related thereto, employer business practices, and/or human resources best practices evolve, and therefore, may require updating based upon such changes. Some embodiment may provide for periodic review of these sources of potential change and updating the developed materials based upon such periodic review. Alternatively, an employment law information source may be used to develop, update and supply these materials, or portions thereof. In such situations, the employment information source may provide the defined set of employment action. This defined set may be obtained upon request and/or delivered on a periodic basis.

The defined set of employment actions whether created internally or received from an employment law information source may be used to dynamically generate an employment action selection interface such as described above from which the interaction request is received. In some instances, the full set of employment actions may be included in the interface. In others, only a list of employment actions constituting a subset may be used. In some such embodiments, the agent's relationship with the employer may serve as a basis for selecting the subset. For instance, a human resources manager might be given access to the full range of employment actions whereas a non-managerial employee might have a significantly more limited range of available actions. The relationship between the agent and the employer may be indicated or determined in some instances from agent identification information. The relationship could be directly encoded in the agent identification, or the agent identification information could be used to access a human resources database to determine the relationship. Where an employment law information source is used, the list for inclusion in the interface may be selected locally by selecting actions from a received set, or the selection may occur remotely at the employment law information source. In the latter situation, information from which the agent's relationship with the employer may be derived may need to be forwarded to the employment law information source by any suitable mechanism including agent identification information or an indicator of the relationship in a request to the employment law information source for the list of employment actions to include in the interface.

In some embodiments, access to the environment may be further limited by security measures. For instance, agent identification information and/or verification information associated with the agent may be used to verify the authority of the agent to perform tasks associated with the selected employment action. The agent identification information may be obtained in a variety of ways including, without limitation, being received as part of the initial request, such as supplied by a cookie on the agent's computer, entry of the agent identification information via a provided interface, voice recognition, etc. The identification information may include a user name, or equivalent, and a password, which could be compared with entries in a data store such as an agent data store or the employer's human resources database. In any of these cases, a verification step may be used to determine whether the identified agent has authority to perform the selected employment. The verification could be the user name/password comparison described above with access information also stored in an agent data store. Alternatively, the access authority may be derived from the agent's relationship with the employer and verification and determination of this relationship may occur through accessing the employer's human resources database. Some embodiments may provide an administrative interface for registering new agents. Information associated with the new agent may be received from the interface and stored in a data store. The received information typically includes agent identification information and may also include verification information such as a password and/or information indicating the new agent's relationship with the employer.

In response to the request to interact in step 310, access is provided to process documentation in step 320. This process documentation guides the agent through a process associated with the selected employment action. The process as described above is designed to guide the agent through the tasks involved in the selected employment action in a way so as to minimize the potential for noncompliance with the employment laws based upon the particular instance of accomplishing the selected employment action. The agent interacts with the process documentation through any suitable and/or available user input and output devices. The process documentation in a typical environment may be retrieved from a data store and sent to the agent. In other embodiments, the process documentation may be supplied by an employment information source. In some such embodiment, the agent's interface (e.g., browser, AVR, email, etc.) with the environment may be redirected to the employment law information source. Several example employment actions and descriptions of associated process documentation are provided in greater detail below.

In some embodiments, the process documentation, or portions thereof, may be dynamically generated. Such dynamically generated documents may include static portions that are specific to the selected employment action. Dynamic portions may relate to specific facts already received regarding a particular instance of the selected employment action. The accumulated facts may be stored and retrieved during the interaction with the process documentation to and from a data store such as an instance data store and/or to and from a separate human resources database.

The agent may use any supported user input and/or output devices to view and interact with process documentation. In one typical embodiment, the user input/output device constitutes a user computer with appropriate output devices such as a monitor, sound system, printer, etc., and input devices such as a keyboard, a microphone, a mouse, etc. The computer may run conventional browser software to allow viewing of, and interaction with, the process documentation; alternatively, an environment specific application may be used. In some embodiments using a computer as the user input/output device an automatic email response system may be supported either solely, or in addition to, a conventional browser based access approach. Instead, or in addition, an agent may use a standard telephone as an appropriate user input and output device. Some embodiments may support other output devices such as facsimile machines. A facsimile device or scanner could also be used as an input device assuming agent interaction could be discerned from the transmitted or scanned document.

In step 330, interactions of the agent are stored. These interactions may be stored in a data store such as an instance data store and/or in a separate human resources database. If the agent has not completed the selected employment action, access to further process documentation in step 320 may be provided.

A compliance report is generated in step 340. Compliance reports may be generated on a periodic basis, upon request or upon occurrence of a trigger event. A variety of different reports may be generated, and each such different type may have one or more ways to initiate such generation.

Exception reports may be generated and provided to designated agents to flag potential compliance issues. Such reports may be generated as a result of an action or omission of an agent that falls outside quantifiable and objective preset parameters.

Other reports may be generated periodically or upon demand. Certain types of reports may be keyed to specific employment actions such as a report detailing all instances of selection and hiring of new employees for a given period or to specific instances of specific employment actions such as a report detailing the selection and hiring of a particular employee. Such reports could be generated in certain embodiments based upon a receive request including an employment action indicator. Other report types could be keyed to one or more particular employees. Such reports would serve as evidence of the employer's use of employment law compliant processes in dealing with particular employees for given employment actions. More generally, a variety of criteria may be provided via request to generate compliance reports; such criteria may include agent name, agent identification, date, time period, department, location, employment action and combinations thereof. In some embodiments, a report criteria selection interface may be provided to allow an agent to select specific criteria for report generation. Such an interface could serve to originate a report request. Other embodiments may use appropriately configured links associated with descriptive report-type names in a standard HTML page to originate an appropriate report request with criteria indicated as parameters. A report request could also, in certain embodiments, originate from computer programs executed by human resources personnel, where such computer programs may be configured, or designed, to generate acceptable report requests.

The report requested may require certain access authority to generate and/or send. Such access authority may be determined as described above with respect to access to particular employment actions. In some embodiments, the determination and/or verification of authority may be implicit in the agent's relationship with the employer. Information indicative of this relationship such as agent identification information may be included with a particular report request.

In step 350, the generated report is sent to one or more report agents of the employer. In the case of a periodically generated report, a predefined distribution list may be used to designate the appropriate one or more report agents. Similarly, event triggered reports may have associated with the trigger event a list of one or more report agents who should receive the triggered report. In the case of requested reports, the request may designate one or more report agents who should receive the requested report. In some instances, the requestor may be implicitly designated as a report agent. In all cases the generated report is sent to an output device associated with each of the one or more report agents. The output device may, in certain instances, be designated along with the designation of the agent such as in a request. In addition to, or instead of, output device designation in the request, the output device designation may be stored in an agent data store or in a separate human resources database and retrieved based on agent identification information associated with each report agent. In instances where both mechanisms are used, the stored designation may be used as a default that may be overridden by an output device designation in conjunction with the designation of the agent as a report recipient.

The output device may be any suitable device allowing the report agent to perceive the report; typically, the output device will be one or more of the following, singly or in combination: printer, printer with hard copy forward, facsimile machine, telephone, email account and computer. In the instance of a printer with hard copy forward, the report may be sent to a specific print output device at a distribution center, and the generated hard copy may be forwarded to the report agent via a suitable delivery mechanism such as mail, courier and facsimile. In the instance of a computer, the report may be sent in a variety of forms and displayed in a variety of ways. For example, the report may be sent directly to the requesting agent's computer and viewed through a browser. Instead, or in addition, the generated report could be sent to and stored by a web server for subsequent retrieval by authorized report agents. In other instances, the generated report may be sent to a computer associated with the report agent via ftp or email where the report could be provided in any supported format such as plain text, HTML, PDF, XML, SGML, Post-Script, etc.

In some embodiments, education facilities may be provided in support of the employment law compliance functionality. Access to employment law sensitivity education materials is provided to one or more designated agents of the employer. The materials typically take the form of employer policy statements, employer procedure statements, employment law specific materials (e.g., harassment, discrimination, etc.) and combinations of such materials. This facility may provide other materials if deemed appropriate for supporting employment law compliance. The interactions of the designated agents with the education materials are monitored and stored.

A selection process may be used to select designated agents for particular employment education. Education may occur at periodic intervals or as needed based upon circumstances such as when handling a particular employment action with respect to a particular employee. In the former case, selection of designated agents for periodic training may be based upon an agent's relationship with the employer; for example, all managers in division X of the employer may be designated for initial or refresher materials on investigating employee complains on a periodic basis. In addition, or instead, selection may be implied. For example, a manager requesting interaction for corrective action may be provided with refresher materials on the proper grounds and procedures for corrective action. The manager may be designated for training based upon requesting the particular employment action; this designation may be further conditioned on a record of the manager's most recent exposure to the same materials. Such a record could be stored in a data store or a separate human resources database. In some embodiments, one or more agents may be designated for employment compliance education where the education compliance materials may be selected based upon each agent's relationship with the employer. For example, all new hires may be designated for employment education, but the specific materials for each may be selected based on each new hire's position. Such a relationship may be determined, in certain embodiments, from agent identification information associated with the designated agent. The agent identification information associated with each designated agent may be received at the time the agent is designated.

In some embodiments, notification of designation for employment compliance education may be sent to each designated agent. The notification may be delivered via any suitable mechanism such as email, voice mail, facsimile, pager, event placed on designated agent's calendar, etc. The notification in some instances may include a link to the appropriate materials to be used by the designated agent who received the particular notification.

Specific Employment Action Examples

The example employment actions and associated processes and process documentation described below are illustrative of the types of actions supported according to the present invention. These descriptions are provided by way of example only and are not intended as limiting the present invention. Certain embodiments may include or exclude some or all of these example employment actions and may or may not include other employment actions without departing from the scope of the invention.

Handling Employee Complaints

Figure 4:
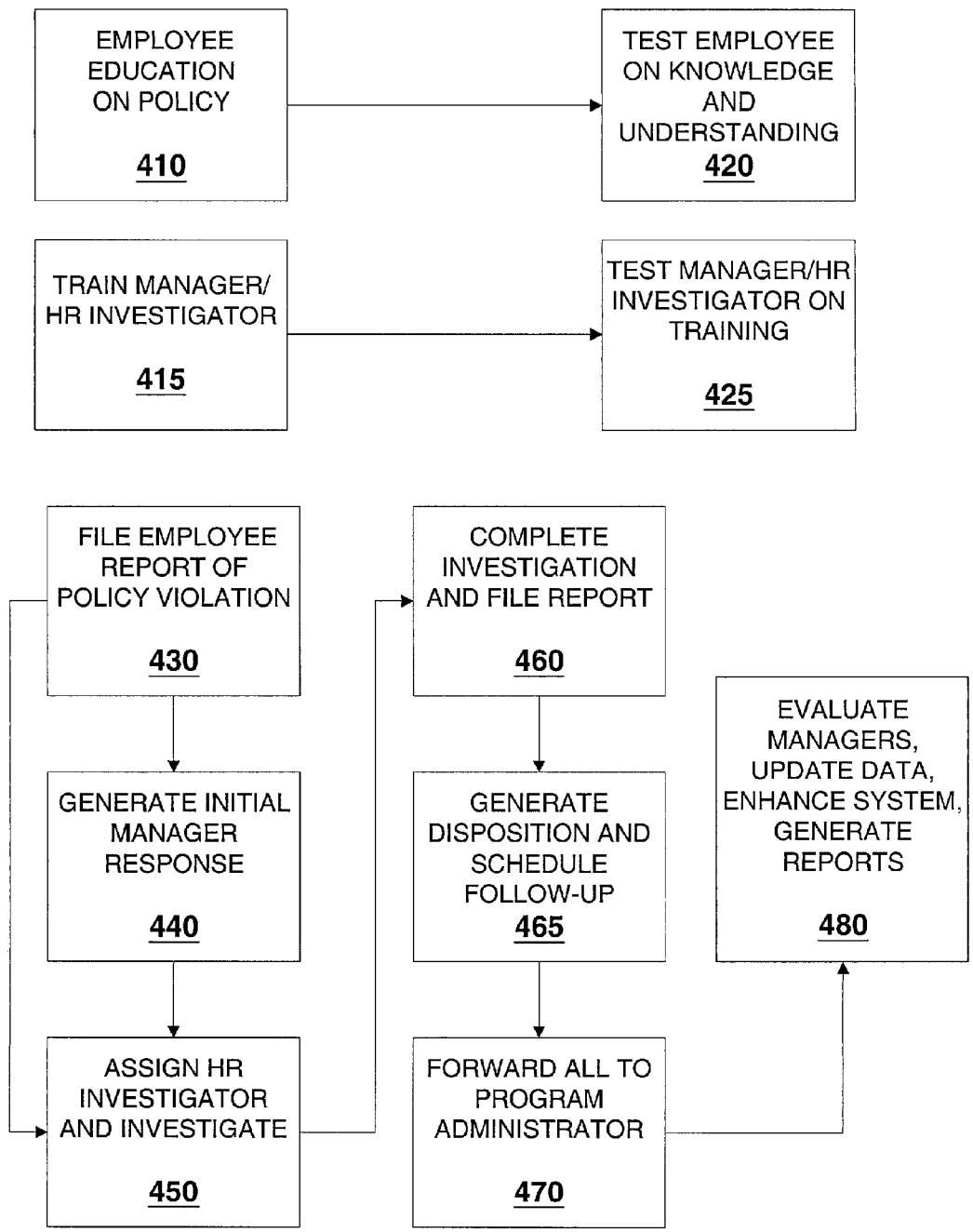
FIG. 4 is a flow chart of example process for handling employee complaints.

FIG. 4 illustrates establishing a process for handling employee complaints in compliance with the laws against discrimination, harassment and retaliation.

The employee-user has computer access to the information listed in step 410 (the Fair Employment Commitment, the Notification Process, and training materials which explain the Fair Employment Commitment and Notification Process). The employee's understanding of this information is confirmed by on-line responses (Fair Employment Commitment Quiz and Notification Process Quiz—step 420). This information and training may be delivered to the employee in hard copy or person-to-person, or by other, non-computer media, rather than on-line.

The employee who believes he/she is the victim of discrimination, harassment or retaliation in violation of the Fair Employment Commitment may make a Report of Violation using a computer form (step 430). This is routed to either a manager or a human resources official, as the employee directs. The employee need not be limited to making a report of violation on-line. He/she may make an oral or written report to any member of management or the Human Resources Department, or may use a confidential telephone or e-mail "hotline" if available. In this case, the receiving member of management initiates the online Report of Violation in step 430.

In step 415, all managers receive training on the Fair Employment Commitment and Notification Process (analogous to the employee training but directed to managers). They may also receive training on complaint investigation. Their understanding of this training is tested on-line (step 425).

If a manager receives a Report of Violation, he/she makes an Initial Response (step 440) to the employee and forwards the report to Human Resources. Typically, Human Resources will assign an investigator to the Report of Violation. Human Resources investigators receive the training in step 415 and are tested on this training (step 425). The assigned investigator accesses the investigation checklist (step 450) and, using it as a guide, moves through the investigation, identifying issues, reviewing relevant documents preparing for witness interviews, carrying out witness interviews, assembling findings, preparing a report and recommendation, and following up with the affected employees, using prior complaint history of parties, data on prior complaints of this type, interview guides, and a model investigative report and recommendation. The investigator generates a completed checklist and a report and recommendation (step 460). Once a decision is made to act on the report and recommendation, the investigator generates a disposition, and calendars the matter for follow-up (step 465). The investigator then sends the disposition and calendar notifications to the manager. The disposition, together with the completed checklist and report and recommendation, is also sent to the Program Administrator (step 470).

The Program Administrator reviews the completed checklist, the report and recommendation, and the disposition in order to generate manager and investigator evaluations, to update claims data, make enhancements to the system suggested by the employee complaint, its investigation and resolution, and generate reports (step 480).

Corrective Action

Figure 5:
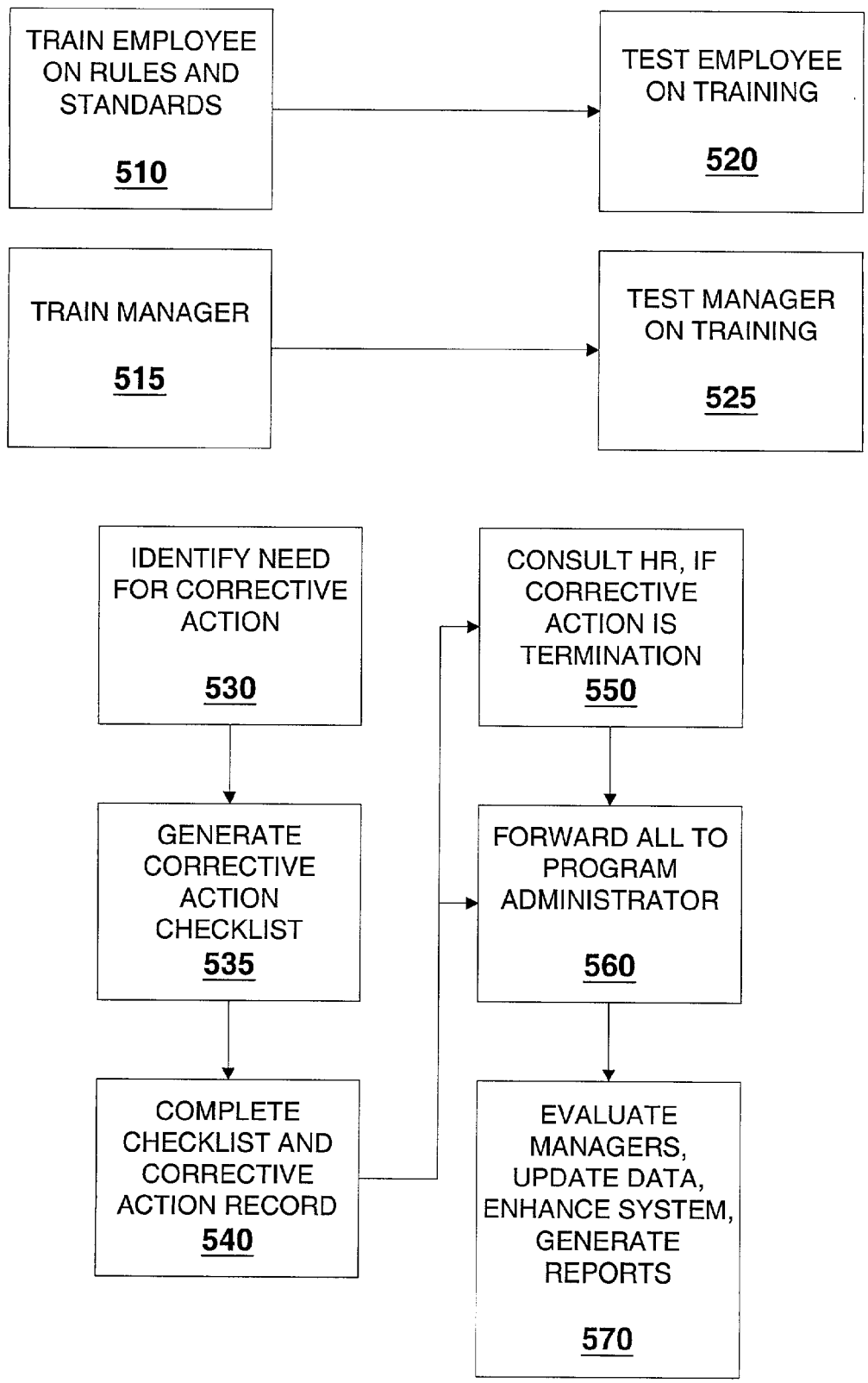
FIG. 5 is a flow chart of example process for taking corrective action.

FIG. 5 illustrates establishing a process for taking action to correct employee misconduct or poor performance in compliance with the laws against discrimination, harassment and retaliation. The employee-user learns work rules and the performance standards for his/her job on-line (step 510). The employee's knowledge of the rules and standards is tested on-line (step 520). Rules and standards may be learned by the employee in a variety of non-electronic methods, including classroom training and orientation, on the job, and in staff meetings.

All managers receive training on how to make non-discriminatory discipline and discharge decisions (step 515) and are tested on their understanding of this topic (step 525). When the manager determines there is a need for corrective action (step 530), he/she generates a corrective action checklist (step 535). Using the checklist as a guide, the manager moves through the corrective action process, documenting the reason for corrective action, the employee's explanation, the impact of the employee's misconduct or poor performance on the business, any extenuating factors, and the fairness and consistency of the corrective action selected. The manager may consider the categories of information available to him on-line or via other media: the work rules and performance standards, the employee's performance and training histories, and corrective action taken in other similar situations.

Based on the information considered, the manager completes the corrective action checklist and a record of corrective action (step 540). Managers are encouraged to partner with Human Resources in making discipline decisions. If the corrective action is termination, Human Resources must be consulted and approve the decision (step 550).

The completed checklist and record of corrective action are sent to the Program Administrator (step 560) who utilizes the information in carrying out manager performance evaluations, updating workforce data, making enhancements to the system suggested by the corrective action process and disposition, and generating reports (step 570).

Employee Selection

FIG. 6 illustrates establishing a process for employee selection in compliance with the laws against discrimination, harassment and retaliation.

For each position the hiring manager needs to fill, the manager generates a selection checklist (step 610). Using the checklist as a guide, the manager defines the functions and minimum qualifications for the position to be filled, the appropriate candidate pool, and appropriate selection methods, accessing a job description and a statement of minimum qualifications for the position (step 620). The manager then generates an on-line "position available" posting, which is now added to the list of positions available (step 630). Positions available may also be posted on a bulletin board, advertised in a newspaper or otherwise communicated to job-seekers.

The job-seeker-user has on-line access to the list of positions available, together with the job description and statement of minimum qualifications required for each position (step 640). If the job seeker wishes to apply for a position, he/she completes an on-line Expression of Interest form and an on-line skills test, if required (step 645).

The hiring manager receives the Expressions of Interest and test results, if any (step 650). The hiring manager may also receive applications from job seekers in person or in writing, or by other non-computer methods. The manager also has access to the diversity program or affirmative action plan (AAP) goals, if any, for the position (step 660). All hiring managers receive training on how to make non-discriminatory selection decisions (step 604) and are tested on this topic (step 608). Continuing to use the selection checklist, the manager evaluates all candidates, conducts interviews of finalists, guided by on-line interview outlines appropriate to the available position, and completes applicant evaluations (step 670).

Hiring managers are encouraged to partner with human resources in making selection decisions. (If the selection decision involves an individual with a disability, human resources must be consulted).

Once a selection decision has been made, the completed checklist and applicant evaluations are sent to the Program Administrator (step 680). Using this information, the Program Administrator generates manager evaluations, updates the diversity program or affirmative action plan and other employee data, makes enhancements to the system as suggested by this selection process, and generates reports (step 690).

ADA Analysis

FIG. 7 illustrates managing compliance with the Americans with Disabilities Act, and, specifically, a compliant process for determining whether an applicant or employee is covered under the ADA and what accommodation, if any, may be required.

An applicant or employee reviews the job description for the position applied for or held (step 710). The job description describes the essential functions of the job, may be stored in a database, and may be reviewed by the individual at a computer terminal. If an individual discloses after reviewing the job description that he is unable to perform some/all the essential functions because of a disability, the manager's obligation is triggered to analyze the situation under the ADA (step 720). The manager's obligation may be triggered by the individual voluntarily disclosing a disability, and/or by the individual requesting an accommodation for a disability. However, review of the job description and the individual's certification as to whether he can perform the essential functions is the most obvious opportunity for disclosure of a disability, and the initiation of the ADA analysis.

Alternatively, the Manager may observe that the individual has a disability at any point during the selection process, for example, if the individual is in a wheelchair. The obligation to initiate the ADA analysis is then triggered (step 720).

All Managers receive an education on the ADA (step 704), and their understanding is tested (step 708). When an individual discloses or is observed to have a disability, the Manager accesses an on-line ADA Analysis checklist. The manager works through the checklist to determine whether an individual who is otherwise qualified for the position, is a covered individual under the ADA, and, if so, to determine whether a reasonable accommodation may be appropriate to enable the individual to perform the essential functions of the job (step 730). The manager uses template communications to exchange information with the individual and/or his/her healthcare provider regarding the individual's condition (step 735).

When all relevant information regarding ability to perform the essential functions of the job, and/or reasonable accommodations has been considered, Manager makes an accommodation recommendation to human resources (HR) for approval, at the same time submitting the completed ADA checklist (step 740). All managers are encouraged to partner with HR in the ADA analysis. If the recommendation is approved, the manager communicates it, together with information about any reasonable accommodation, to the individual (step 750). If the recommendation is denied, the manager communicates the denial to the individual (step 760). A calendar follow-up date for the manager to review how the accommodation is working after a reasonable time is generated.

Program Administrator receives notification of the accommodation decision and the completed ADA checklist (step 770). Program Administrator reviews these to evaluate Manager's performance, update workforce data, and generate reports (step 780).

FMLA Management

FIG. 8 illustrates managing compliance with the Family and Medical Leave Act. Each employee has access to the employer's leave policy, which describes the conditions for eligibility for family and medical leave, the length of leave, and the process for obtaining leave (step 810). The employee makes a request for leave, which may be performed online in some embodiments (step 820). The request is routed to Human Resources, with a copy to the employee's manager. The employee may make a verbal request for leave to his manager, which the manager enters into the system and forwards to Human Resources (step 820). All managers receive compliance education on the FMLA and the employer's leave policy (step 805). Managers are encouraged to partner closely with HR throughout the leave management process.

When Human Resources receive a request for leave, the FMLA checklist is accessed. Using this as a guide, HR then assesses the employee's eligibility, and gives the required notice to the employee (step 840). HR obtains any necessary information from the employee or the employee's healthcare provider, using the template documents available, preferably on-line (step 850). A decision is made on the leave request (step 860). HR receives a calendar notification when the leave is about to end, and/or when FMLA leave has been exhausted, prompting further appropriate action. The manager is copied on the FMLA notice and kept informed of key dates and further action.

Program Administrator receives the FMLA notice, and the completed FMLA checklist (step 870). Program Administrator reviews these to evaluate manager performance, update workforce data, and generate reports (step 880).

Job Classification

FIG. 9 illustrates managing compliance with the Fair Labor Standards Act, and specifically managing the compliant classification of employee and contractor positions, and of employee positions for overtime pay exemption purposes.

Managers receive training regarding the employer's legal obligations regarding overtime compensation, and contractor relationships (step 905). When a manager is faced with creating a new work opportunity, the manager must determine whether the new work will be performed by an employee or a contractor, and whether, if a new employee position is created, whether the position is exempt from overtime payment. The manager has access to an on-line checklist to guide him/her through a series of questions to ascertain the degree of control exercised over the work performance to determine the appropriateness of a contractor relationship rather than an employment relationship. The manager also has access to an online checklist to enable him/her to determine whether, if an employment relationship exists, the work qualifies for one of the exemptions from the obligation to pay overtime for hours worked in excess of forty a week (step 910). Using these tools and a template document, the manager prepares a job description, including the recommended classifications (step 920). The manager submits the proposed job description to Human Resources for approval before beginning the selection process (step 930).

The Program Administrator receives completed checklists from the manager, and the approved job description for new positions (step 940). The Program Administrator reviews these to evaluate manager performance, update workforce data, and generate reports (step 950).

Introductory Performance Evaluation

Figure 10A:
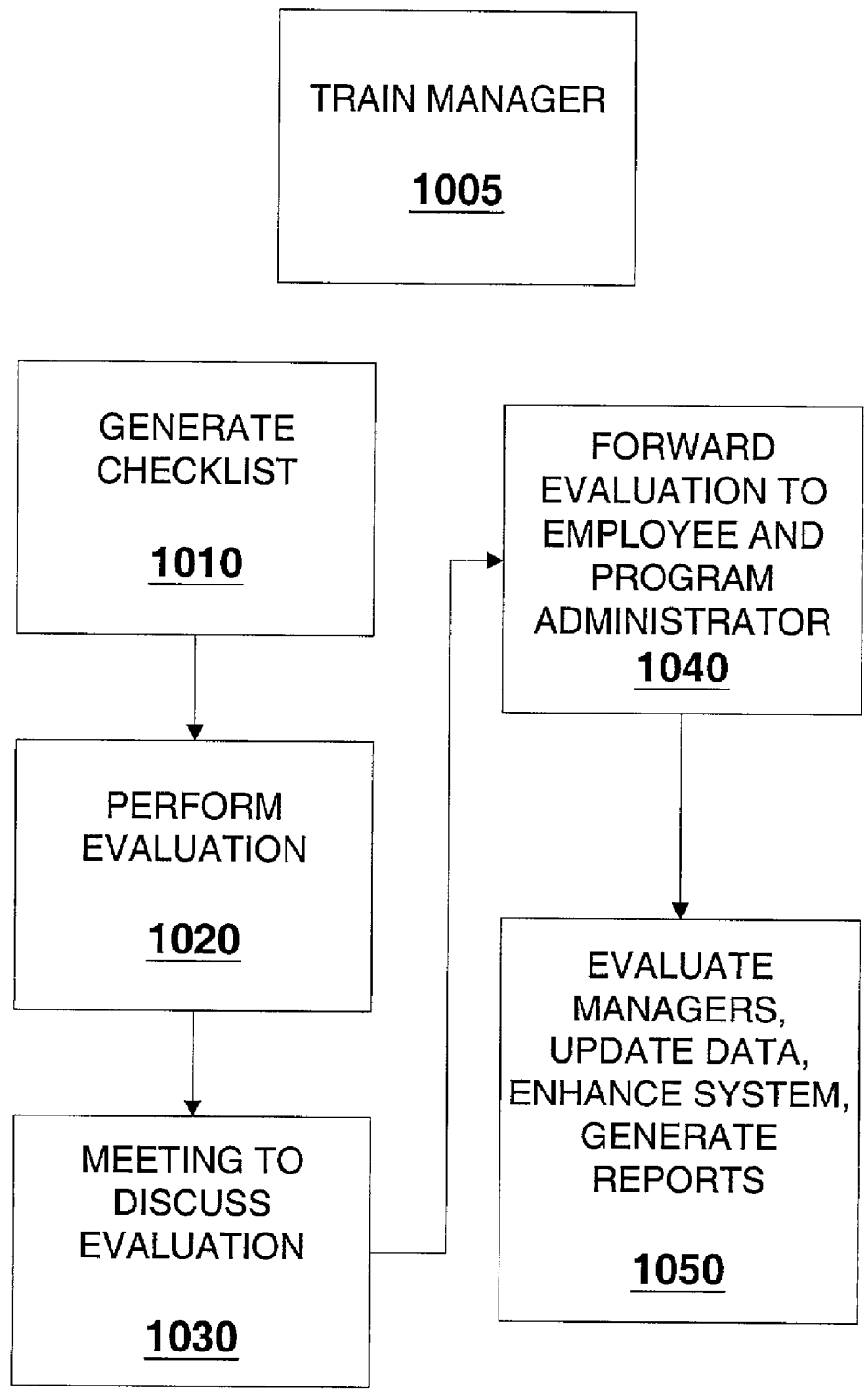
FIGS. 10A-B are flow charts of example process for performing introductory and regular (periodic) performance evaluations, respectively.

FIG. 10A illustrates establishing an introductory performance evaluation process in compliance with the laws against discrimination, harassment and retaliation.

Managers may receive education on how to carry out an evaluation (step 1005). Triggered by a calendar notification a defined period, perhaps 30 days, after a new employee's hire, the manager accesses the performance evaluation checklist (step 1010). Using the checklist as a guide, the manager writes a performance evaluation, considering the job description, records of any employment actions taken with regard to the employee over the last 30 days, and other available employee data (step 1020). The manager schedules an in-person meeting with the employee to go over the evaluation, and make suggestions for improvement, if appropriate (step 1030). After the meeting, the evaluation will be input and sent to the employee (step 1040). This process will be repeated one or two times within the introductory period, perhaps at 60 days and 90 days after hire.

Managers are encouraged to partner closely with Human Resources throughout the performance evaluation process.

The Program Administrator is copied on the introductory evaluations (step 1040). The Program Administrator reviews these to evaluate Manager performance, update workforce data, and generate reports (step 1050).

Regular Performance Evaluation

Figure 10B:
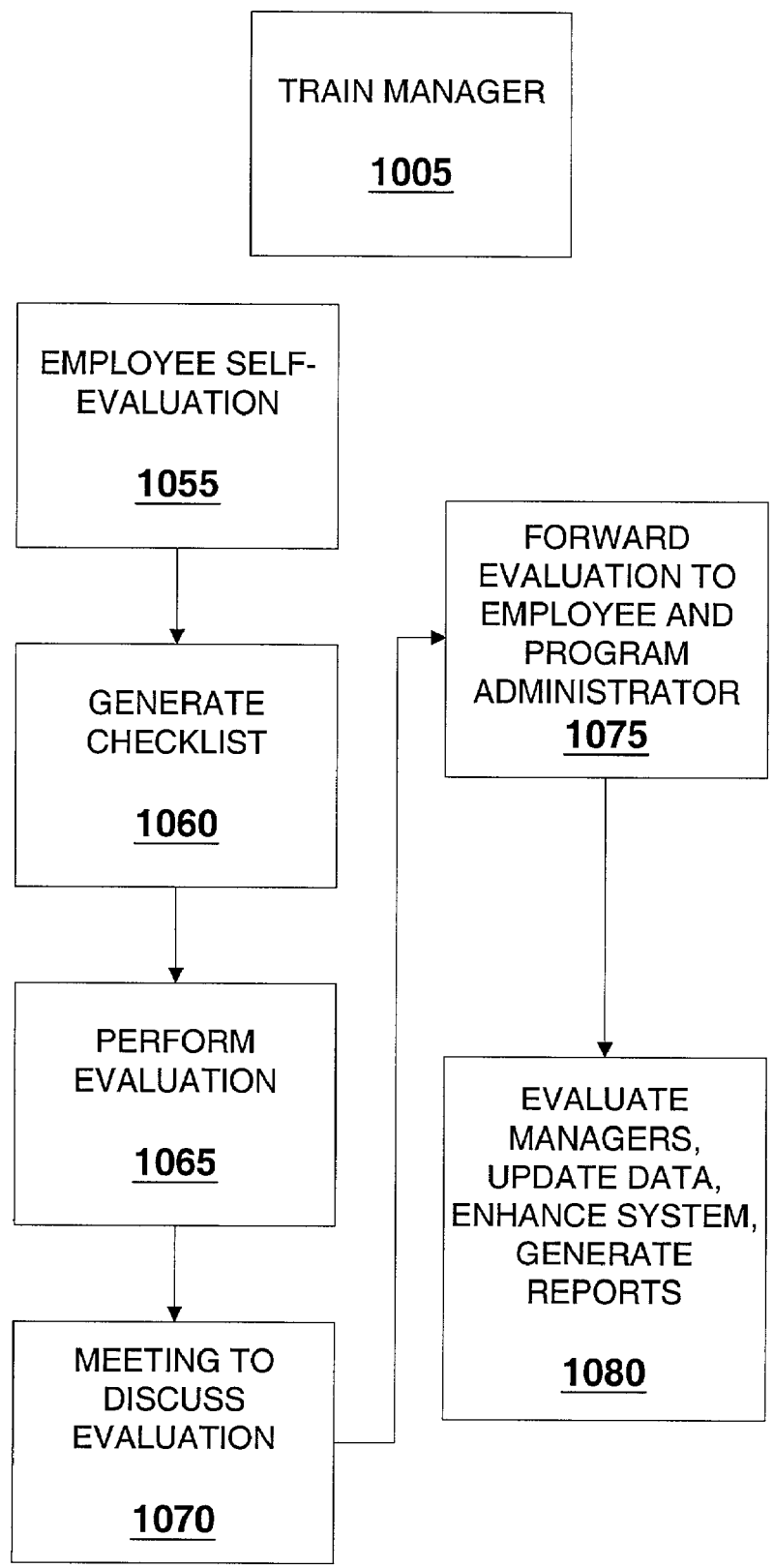

FIG. 10B illustrates establishing a regular performance evaluation process in compliance with the laws against discrimination, harassment and retaliation.

Triggered by a calendar notification of the evaluation due date, the employee accesses online the job description and the goals and timetable set at the last evaluation. Using these resources, the employee completes an on-line self-evaluation and submits it to the manager (step 1055).

Managers may receive training on how to carry out an evaluation (step 1005). Triggered by a calendar notification of the evaluation due date, the manager accesses the performance evaluation checklist and the regular performance evaluation form (step 1060). Using the checklist as a guide, the manager writes a performance evaluation, considering the employee's self-evaluation, the job description, goals and timetable from the last evaluation, records of employment actions taken with regard to the employee over the evaluation period, evaluations from co-workers who have knowledge of the employee's performance over the evaluation period, and other available employee data (step 1065). The manager schedules an in-person meeting with the employee to go over the evaluation, and to set goals and timetable for the next evaluation period (step 1070). After the meeting, the goals and timetable will be input and sent to the employee, along with the evaluation (step 1075).

Managers are encouraged to partner closely with Human Resources throughout the performance evaluation process. Human Resources may be responsible for setting the evaluation due date, and selecting and notifying the co-workers to do evaluations.

The Program Administrator is copied on the evaluation and the goals and timetable set for the next period (step 1075). The Program Administrator reviews these to evaluate Manager performance, update workforce data, and generate reports (step 1080).

Workplace Violence Prevention

Figure 11:
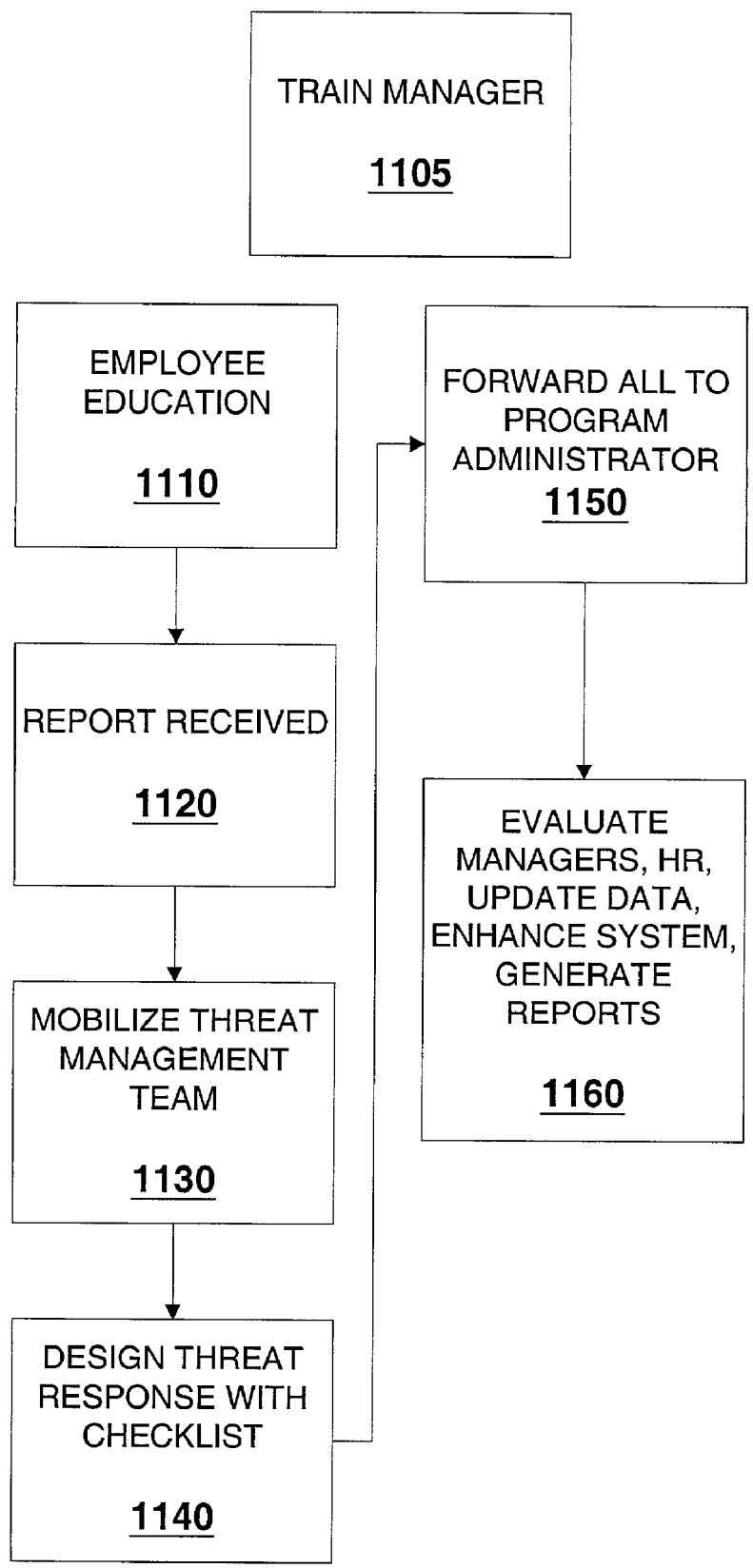
FIG. 11 is a flow chart of example process for handling reports of threats of workplace violence.

FIG. 11 illustrates a compliant workplace violence prevention program. Employees have access to the Company's workplace violence policy, and receive periodic communications about the policy and the workplace violence prevention program (step 1110). An employee may report a threat of violence directly to his manager (step 1120). Managers receive education on the workplace violence prevention program, and have access to on-line tools (requests for criminal records check, sample reference questions, sample interview questions) to aid them in screening out candidates for employment who pose a risk of violence (step 1105). Immediately upon receipt of the report of a threat from an employee, the manager mobilizes the threat management team (step 1130).

Alternatively an employee may report a threat of violence via a telephone hotline (step 1120). The hotline contractor sends an email or other communication to HR to trigger the mobilization of the threat management team (step 1130)

The team is led by Human Resources who design and implement the appropriate threat response and follow-up procedures (step 1140). In designing and implementing the response and follow-up, Human Resources work through an online response checklist, using associated tools and template documents, including investigation guidelines, a confrontation model, model incident report format, to determine immediate and intermediate safety and security measures, assess and investigate the threat, adopt a diffusion strategy, and follow up and achieve closure with all effected employees. The Program Administrator receives the completed response checklist, and the completed incident report (step 1150). The Program Administrator reviews these to evaluate Manager and Human Resources performance, update data, and generate reports (step 1160).

Reductions in Force

FIG. 12 illustrates managing a compliant process for conducting a reduction in force (RIF), including compliance with non-discrimination laws, OWBPA and the WARN Act.

When a reduction in force is necessary, the manager is presented with a RIF decision checklist specifying the premise for the RIF and the cost savings to be achieved in the manager's unit (step 1210). All managers receive education on how to conduct reductions in force (step 1205) and are encouraged to partner with Human Resources in completing the process. The manager works through the checklist identifying positions to be eliminated, and matching employees to the surviving positions, to arrive at the RIF recommendations for his department, which he forwards to HR for review and approval (step 1220). If approved, the manager communicates with all employees in the department, either in groups or individually, about the RIF, using provided compliant materials as a resource (step 1230).

When a reduction in force is necessary, Human Resources determines whether WARN notices are required, after working through an on-line WARN checklist to determine whether the reduction in force meets the Act's definition of a plant closing or mass layoff, the effected employees suffered an employment loss, and any exception to the notice requirements apply (step 1240). HR completes the template notices, if required, and gives them to Employees and the appropriate governmental units (step 1250). If a waiver of claims is to be requested from employees terminated in the RIF, HR works through the OWBPA checklist to prepare a valid and enforceable waiver, with the appropriate safeguards for voluntariness, and incorporates the waiver into the appropriate template severance agreement (step 1260). The manager presents these to employees in individual meetings (step 1265).

The Program Administrator receives notification of the RIF decisions from HR (H) and completed checklists from Manager and HR (step 1270). Program Administrator reviews these to evaluate Manager and HR performance, update workforce data, and generate reports (step 1280).

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A method of facilitating compliance with employment laws having varying requirements, and establishing such compliance, the method comprising the steps of:
   a) receiving a request to interact from an agent of an employer, wherein the received interaction request comprises an action indicator corresponding to a selected employment action;
   b) providing access to process documentation related to a process associated with the selected employment action, wherein the process is designed to minimize potential for non-compliance with the employment laws, wherein the process documentation guides the agent through the process via interactions between the agent and the process documentation via the user input and output devices, wherein the accessed process documentation is provided and maintained by an employment law information source external to the employer;
   c) storing information related to agent interactions with the process documentation in a compliance data store;
   d) generating a compliance report based upon the stored interaction information; and
   e) sending the generated compliance report to one or more report agents of the employer via an output device associate with each;
   f) creating by the employment law information source a set of employment actions impacting compliance with the employment laws;
   g) creating by the employment law information source a process associated with each employment action in the set and documentation related to each such process supporting execution of the respective process; and
   h) storing the created set and the created process documentation in a presentation data store.

2. The method of claim 1, and further comprising the step of i) reviewing the one or more of the employment laws for requirements and wherein the steps of creating the set of employment actions, processes associated with each action and documentation associated therewith are based upon the requirements determined during the review of the employment laws.

3. The method of claim 1, and further comprising the step of i) updating the created set of employment actions, the created processes and the created documentation based upon developments in human resources best practices.

4. The method of claim 1, and further comprising the step of i) updating the created set of employment actions, the created processes and the created documentation based upon developments in employment law.

5. The method of claim 4, and further comprising the step of j) reviewing the employment laws for requirements on a periodic basis and wherein the step of updating the created set, the created processes and the created documents occurs as a result of changes in the employment laws identified during the periodic reviews.

6. The method of claim 1, and further comprising the step of i) updating the created set of employment actions, the created processes and the created documentation based upon changes in business practices of the employer.

7. The method of claim 1, wherein the step of providing access to the process documentation comprises the steps of retrieving the process documentation from the presentation data store and sending the retrieved process documentation to an output device associated with the agent.

8. The method of claim 1, and further comprising the steps of i) selecting one or more employment actions from the created set for inclusion in a list of employment actions impacting compliance with the employment laws; j) providing the agent with an employment action selection interface that allows the agent to select an employment action from the list via a user input device; and wherein the received interaction request is received from the provided employment action selection interface.

9. The method of claim 8, wherein the step of selecting one or more employment actions is based upon a relationship between the agent and the employer.

10. The method of claim 9, and further comprising the steps of k) receiving agent identification information corresponding to the agent and l) determining the agent's relationship with the employer based upon the received agent identification information.

11. The method of claim 1, and further comprising the step of i) providing the agent with an employment action selection interface that allows the agent to select an employment action from a list of employment actions impacting compliance with the employment laws via a user input device; and wherein the received interaction request is received from the provided employment action selection interface.

12. The method of claim 11, and further comprising the step of i) receiving the list of employment actions from the employment law information source.

13. The method of claim 12, and further comprising the step of k) requesting the list from the employment law information source.

14. The method of claim 13, wherein the request to the employment law information source comprises information indicating a relationship between the agent and the employer.

15. The method of claim 14, wherein the information indicating the relationship between the agent and the employer comprises agent identification information corresponding to the agent from which the agent's relationship with the employer may be determined.

16. The method of claim 11, and further comprising the steps of j) receiving a set of employment actions from the employment law information source and k) creating the list of employment actions from the received set of employment actions.

17. The method of claim 16, wherein the step of creating the list comprises the step of selecting one or more employment actions from the received set for inclusion in the list of employment actions.

18. The method of claim 1, wherein the step of providing access to the process documentation comprises the step of directing an output device associated with the agent to the process documentation via the employment law information source.

19. The method of claim 1, wherein the received interaction request is received from a human resources computer program being executed by the agent.

20. The method of claim 1, wherein the step of providing access to the process documentation comprises the step of accessing an employment data store associated with the employer to retrieve employment data associated with at least one employee involved with the selected employment action.

21. The method of claim 1, wherein the step of providing access to the process documentation comprises the step of accessing an employment data store associated with the employer to store employment data associated with at least one employee involved with the selected employment action.

22. The method of claim 1, wherein the step of storing information related to the interactions of the agent comprises the step of accessing an employment data store associated with the employer to store employment data associated with at least one employee involved with the selected employment action.

23. The method of claim 1, and further comprising the steps of i) providing access to employment sensitivity materials selected from the group consisting of employer policy statements, procedure statements, training materials and combinations thereof to designated agents of employer; j) monitoring each designated agent's interactions with the employment law sensitivity materials; and k) storing the monitored interactions in the compliance data store.

24. The method of claim 23, wherein the step of providing access to employment law sensitivity materials occurs on a periodic basis.

25. The method of claim 23, and further comprising the step of l) selecting the employment law sensitivity materials to which each designated agent is provided access based upon a relationship between the agent and the employer.

26. The method of claim 25, and further comprising the steps of m) receiving agent identification information corresponding to the agent and n) determining the agent's relationship with the employer based upon the received agent identification information.

27. The method of claim 23, and further comprising the step of l) sending a notification to one or more designated agents to participate in employment compliance education.

28. The method of claim 27, wherein the notification comprises a link to the employment sensitivity materials.

29. The method of claim 27, and further comprising the step of m) selecting one or more agents of the employer as designated agents to receive employment compliance education.

30. The method of claim 1, wherein the step of generating a compliance report comprises the step of generating an exception report whenever an interaction by an agent falls outside quantifiable and objective pre-set parameters.

31. The method of claim 1, wherein the step of generating a compliance report comprises the step of generating an exception report whenever a failure of an agent to interact falls outside quantifiable and objective pre-set parameters.

32. The method of claim 1, wherein the step of generating a compliance report comprises the step of generating a compliance report with respect to all instances of a particular employment action.

33. The method of claim 32, wherein the step of generating a compliance report occurs in response to a request and wherein the request comprises an indicator of a particular employment action.

34. The method of claim 1, wherein the step of generating a compliance report comprises the step of generating a compliance report with respect to a single instance of an application of a particular employment action.

35. The method of claim 1, wherein the step of generating a compliance report occurs at periodic intervals.

36. The method of claim 1, and further comprising the step of i) receiving a request for a compliance report from an agent of the employer and wherein the step of generating a compliance report occurs as a result of the received request.

37. The method of claim 36, wherein the received request comprises an indicator indicating one or more sorting criteria selected from the group consisting of agent name, date, time period, department, location, employee name, employment action, type of activity and combinations thereof.

38. The method of claim 36, wherein the request for a compliance report comprises information indicating a relationship between the agent and the employer.

39. The method of claim 38, wherein the information indicating the relationship between the agent and the employer comprises agent identification information corresponding to the agent from which the agent's relationship with the employer may be determined.

40. The method of claim 36, and further comprising the step of j) providing a report request interface via which the agent may submit a compliance report request and wherein the received request for a compliance report is received from the provided interface.

41. The method of claim 40, wherein the provided interface allows the agent to select one or more criterion selected from the group consisting of agent name, date, time period, department, location, employee name, employment action and type of activity and to submit an indicator of the selected one or more criterion as part of a compliance report request.

42. The method of claim 1, wherein each output device associated with a report agent is of a type selected from the group consisting of printer, printer with hard copy forward, facsimile machine, telephone, email account and computer.

43. The method of claim 42, wherein the output device associated with a selected report agent is a printer with hard copy forward and further comprising the step of i) forwarding the generated report sent to the printer to the selected report agent via a delivery mechanism selected from the group consisting of courier service, postal service and facsimile.

44. The method of claim 1, wherein the action indicator corresponds to employee selection and wherein the steps of providing access to process documentation and storing information related to agent interactions comprise the steps of:
   i) providing the agent with access to the stored expressions of interest in an available position;
   ii) providing the agent with access to an interactive checklist of items to be completed in a compliant job selection process using associated documentation comprising at least one document of a documentation type selected from the group consisting of available position information, job description associated with the available position, a set of selection interview questions associated with the available position and affirmative action plan goals and timetable associated with the available position; and
   iii) receiving and storing the interactions of the agent with the interactive checklist.

45. The method of claim 44, wherein the steps of providing access to process documentation and storing information related to agent interactions further comprise the steps of: iv) providing the agent with a job description interface to select a selected job description from a list of job descriptions via the user output device; v) receiving from the provided interface a job description indicator corresponding to the selected job description entered by the agent via the user input device; vi) providing the agent with an available position interface via which the agent may enter information related to an available position corresponding to the selected job description; vii) receiving the entered available position information from the provided available position interface; and viii) storing the received available position information.

46. The method of claim 45, wherein the steps of providing access to process documentation and storing information related to agent interactions further comprise the steps of: ix) receiving requests for the stored available position information from one or more requesting agents of the employer; x) providing access to the stored available position information in response to each received request and to an interface by which a requesting agent to whom access to the stored available position information is provided may express an interest in the available position; and xi) receiving and storing expressions of interest in the available position.

47. The method of claim 44, wherein the steps of providing access to process documentation and storing information related to agent interactions further comprise the steps of: iv) receiving requests for the stored available position information from one or more requesting agents of the employer; v) providing access to the stored available position information in response to each received request and to an interface by which a requesting agent to whom access to the stored available position information is provided may express an interest in the available position; and vi) receiving and storing expressions of interest in the available position.

48. The method of claim 1, wherein the received indicator corresponds to investigating an employee complaint and wherein the steps of providing access to process documentation and storing information related to agent interactions comprise the steps of:
   i) receiving and storing complaint information corresponding to one or more complaints submitted by one or more employees of the employer;
   ii) providing access to the stored complaint information via the user output device associated with the agent
   iii) providing the agent with access to an interactive checklist of items to be completed in a compliant employee complaint investigation using associated retrieved documentation comprising at least one document of a documentation type selected from the group consisting of the stored complaint information and sets of interview questions appropriate for the victim, the offender and other witnesses;
   iv) providing the agent with access to a template report and recommendations interface via which the investigating agent may enter information related to the investigation of the complaint and recommendations for action; and
   v) receiving and storing the interactions of the investigating agent with the interactive checklist and the template report and recommendations interface.

49. The method of claim 48, wherein the step of receiving and storing complaint information comprises the steps of:
   (1) providing an employee of the employer with an interface via which complaint information may be entered; and
   (2) receiving and storing the complaint information received from the provided interface.

50. The method of claim 1, wherein the received indicator corresponds to regular performance evaluation and wherein the steps of providing access to process documentation and storing information related to agent interactions comprise the steps of:
   i) providing the agent with a calendar interface to select a named employee's evaluation due date from a list of dates on which regular performance evaluations are due for all employees;
   ii) receiving from the provided calendar interface a due date indicator corresponding to the selected named employee's evaluation due date;
   iii) providing the agent with a job description interface to select a job description corresponding to the job held by the selected named employee;
   iv) receiving from the provided interface a job description indicator corresponding to the selected job description;
   v) providing the selected named employee with a self-evaluation interface via which information related to a self-evaluation may be entered;
   vi) receiving and storing the entered information related to the selected named employee's self-evaluation;
   vii) providing the agent with access to an interactive checklist of items to be completed in a compliant regular performance evaluation process, using associated retrieved documentation comprising at least one document of a document type selected from the group consisting of the stored self evaluation, the stored job description, and stored previous regular performance evaluations of the selected named employee; and
   viii) receiving and storing the information related to the evaluating agent's interactions with the checklist.

51. The method of claim 1, wherein the received indicator corresponds to introductory performance evaluation and wherein the steps of providing access to process documentation and storing information related to agent interactions comprise the steps of:
   i) providing the agent with a new hire interface to select a new hire from a list of names of employees hired within a pre-set period of time;
   ii) receiving from the provided interface an indicator corresponding to the selected new hire;
   iii) providing the agent with a job description interface to select a job description corresponding to the job held by the selected new hire;
   iv) receiving from the provided interface an indicator corresponding to the selected job description;
   v) providing the agent access to an interactive checklist of items to be completed in a compliant introductory performance evaluation process, using associated retrieved documentation comprising the selected job description;
   vi) providing the agent with an evaluation interface via which the agent may enter information related to an evaluation of the new hire's performance;
   vii) receiving the entered information related to the evaluation; and
   viii) storing the received information related to the evaluation.

52. The method of claim 1, wherein the received indicator corresponds to corrective action and wherein the steps of providing access to process documentation and storing information related to agent interactions comprise the steps of:
   i) providing the agent who perceived a conduct or performance problem with an employee subject to corrective action with access to an interactive checklist of items to completed in a compliant corrective action process using associated documentation comprising at least one document of a document type selected from the group consisting of a job description associated with the employee's position and a rule of conduct;
   ii) providing the agent with an interface into which the agent may enter information related to the corrective action; and
   iii) receiving and storing the information related to the corrective action received from the provided interface.

53. The method of claim 52, wherein the steps of providing access to process documentation and storing information related to agent interactions further comprise the steps of: iv) providing the agent with a job description interface from which a selected job description associated with the employee may be selected; and v) receiving an indicator of the selected job description.

54. The method of claim 52, wherein the steps of providing access to process documentation and storing information related to agent interactions further comprise the steps of: iv) providing the agent with a rules of conduct interface from which one or more selected rules of conduct perceived as violated by the employee may be selected; and v) receiving an indicator of the selected one or more rule of conduct.

55. The method of claim 1, wherein the received indicator corresponds to ADA analysis and wherein the steps of providing access to process documentation and storing information related to agent interactions comprise the steps of:
   i) receiving and storing ability to perform information associated with an applicant;
   ii) providing an agent of the employer with access to stored ability to perform information associated with the applicant;
   iii) providing the agent with access to an interactive checklist of items to be completed in a compliant ADA analysis process using associated retrieved documentation comprising at least one document of a type selected from the group consisting of a job description and template communications to obtain information related to the applicant; and
   iv) receiving and storing the interactions of the agent with the interactive checklist.

56. Them method claim 55, wherein the step of receiving and storing ability to perform information comprises the steps of:
   (1) providing the applicant with a job description interface with which the applicant indicate a selected job description;
   (2) receiving an indicator of the selected job description from the provided job description interface;
   (3) providing the applicant with an ability to perform interface via which the applicant may enter information related to his/her ability to perform the essential functions of a job corresponding to the selected job description;
   (4) receiving the entered ability to perform information from the provided ability to perform interface; and
   (5) storing the received ability to perform information.

57. The method of claim 1, wherein the received indicator corresponds to FMLA management and wherein the steps of providing access to process documentation and storing information related to agent interactions comprise the steps of:
   i) receiving and storing a request for leave;
   ii) providing the agent with access to the stored requests for leave;
   iii) providing the agent with access to an interactive checklist of items to be completed in a compliant FMLA management process, using associated retrieved documentation comprising at least one document of a type selected from the group consisting of a job description and template communications to obtain information relating to the request for leave;
   iv) providing the agent with access to an interface via which the agent may enter information relating to the request for leave; and
   v) receiving and storing the interactions of the agent with the interactive checklist; and the information relating to the request for leave.

58. The method of claim 57, wherein the step of receiving and storing the request for leave comprises the step of:
   (1) providing an interface via which an employee may request a leave;
   (2) receiving a leave request from the provided interface; and
   (3) storing the receive leave request.

59. The method of claim 1, wherein the received indicator corresponds to workplace violence prevention and wherein the steps of providing access to process documentation and storing information related to agent interactions comprise the steps of:
   i) receiving and storing a report of a threat of violence;
   ii) providing the agent with access to an interactive checklist of items to be completed in a compliant threat response process using associated retrieved documentation consisting of investigation guidelines, screening tools for use in criminal records checks, references and interviews, and confrontation model guidelines;
   iii) providing the agent with access to an interface by which the agent can enter information related to the threat of violence;
   iv) receiving and storing the interactions of the agent with the interactive checklist and information related to the threat of violence.

60. The method of claim 59, wherein the step of receiving and storing the report comprises the steps of:
   (1) providing to an agent an interface via which a report threats of violence may be entered;
   (2) receiving the report from the provided interface; and
   (3) storing the received report.

61. The method of claim 1, wherein the received indicator corresponds to employment relationship classification and wherein the steps of providing access to process documentation and storing information related to agent interactions comprise the steps of:
   i) providing an agent with access to an interactive checklist of items to be completed in a compliant employment relationship classification process using associated retrieved documentation consisting of a job description template;
   ii) providing the agent with access to an interface with the job description template by which the agent may enter information about the job;
   iii) receiving and storing the interactions of the agent with the interactive checklists, and the information about the job.

62. The method of claim 1, wherein the received indicator corresponds to overtime exemption classification and wherein the steps of providing access to process documentation and storing information related to agent interactions comprise the steps of:
   i) providing an agent with access to an interactive checklist of items to be completed in a compliant overtime exemption classification process using associated retrieved documentation consisting of a job description template;
   ii) providing the agent with access to an interface with the job description template by which the agent may enter information about the job;
   iii) receiving and storing the interactions of the agent with both the interactive checklists, and the information about the job.

33

63. The method of claim 1, wherein the received indicator corresponds to reductions in force and wherein the steps of providing access to process documentation and storing information related to agent interactions comprise the steps of:
  i) providing an agent with access to an interactive checklist of items to be completed in a compliant reduction in force selection process; and
  ii) receiving and storing the interactions of the agent with the interactive reduction in force selection checklist.

64. The method of claim 63, wherein the steps of providing access to process documentation and storing information related to agent interactions further comprise the steps of: iii) providing an agent with access to an interactive WARN checklist of items to be completed in a compliant WARN Act notification process, using associated retrieved documentation consisting of a WARN notice template; and iv) receiving and storing the interactions of the agent with the interactive WARN Act notification checklist.

65. The method of claim 64, wherein the steps of providing access to process documentation and storing information related to agent interactions further comprise the steps of: v) providing an agent with access to an interactive OWBPA checklist of items to be completed in a compliant OWBPA waiver process, using associated retrieved documentation consisting of severance agreement templates; vi) providing the agent with an interface via which the agent may enter information related to a severance agreement; and vii) receiving and storing the interactions of the agent with the interactive OWBPA waiver checklist, and information related to the severance agreement.

66. The method of claim 63, wherein the steps of providing access to process documentation and storing information related to agent interactions further comprise the steps of: iii) providing an agent with access to an interactive OWBPA checklist of items to be completed in a compliant OWBPA waiver process, using associated retrieved documentation consisting of severance agreement templates; iv) providing the agent with an interface via which the agent may enter information related to a severance agreement; and v) receiving and storing the interactions of the agent with the interactive OWBPA waiver checklist, and information related to the severance agreement.

67. The method of claim 1, wherein the received interaction request further comprises agent identification information and further comprising the step of i) verifying that the agent has authority to perform tasks associated with the selected employment action.

68. The method of claim 67, wherein the step of verifying the authority comprises the step of accessing a human resources database associated with the employer based upon the agent identification information.

69. The method of claim 67, wherein the received interaction request further comprises verification information and wherein the step of verifying the authority comprises the steps of:
  i) accessing stored verification information associated with the agent from an agent data store based upon the agent identification information; and
  ii) comparing the verification information with the stored verification information.

70. The method of claim 1, and further comprising the steps of i) providing an administrative interface to an administrative agent via which the administrative agent may enter information associated with a new agent and j) receiving from the administrative interface the entered information associated with the new agent; and k) storing the received information associated with the new agent in an agent data store.

71. The method of claim 70, wherein the received information associated with the new agent comprises agent identification information associated with the new agent.

72. The method of claim 71, wherein the received information associated with the new agent further comprises verification information associated with the new agent.

73. The method of claim 71, wherein the received information associated with the new agent further comprises an indication of employment action for which the new agent has authority.

74. A system for facilitating compliance with employment laws having varying requirements, and establishing such compliance, the system comprising:
  a) a system data store comprising:
    i) a compliance data store for storing interactions of agents of an employer with process documentation;
  b) a link to a communication channel allowing communication with agents of an employer;
  c) a system processor in communication with the system data store and the link, wherein the system processor executes one or more processes that perform tasks comprising of:
    i) receiving a request to interact from an agent of an employer, wherein the received interaction request comprises an action indicator corresponding to a selected employment action from a set of employment action specified by an employment law information source external to the employer based upon laws promulgated by a legislature;
    ii) providing access to process documentation related to a process associated with the selected employment action, wherein the process is designed to minimize potential for non-compliance with the employment laws, wherein the process documentation guides the agent through the process via interactions between the agent and the process documentation via the user input and output devices, wherein the accessed process documentation is provided and maintained by the employment law information source external to the employer and created by the employment law information source based upon laws promulgated by the legislature;
    iii) storing information related to agent interactions with the process documentation in the compliance data store;
    iv) generating a compliance report based upon the stored interaction information; and
    v) sending the generated compliance report to one or more report agents of the employer via an output device associate with each.

75. The system of claim 74, wherein the communication channel is selected from the group consisting of computer network, direct serial or parallel connection, dial-up connection, wireless connection, bus connection and combinations thereof.

76. The system of claim 75, wherein the communication channel is the Internet.

77. The system of claim 74, wherein the system data store has an architecture selected from the group consisting of a flat file, a hash table, a database and combinations thereof.

78. The system of claim 77, wherein the system data store comprises a database and wherein the database has an organization selected from the group consisting of hierarchical, object-oriented, relational, object-relational, spatial and combinations thereof.

79. The system of claim 74, wherein the system data store comprises a plurality of storage subsystems.

80. The system of claim 74, wherein the system data store further comprises a content data store for storing process documentation.

81. The system of claim 74, wherein the system data store further comprises an agent data store for storing information associated with agents of employers.

82. The system of claim 81, wherein the system data store further comprises a content data store.

83. The system of claim 74, wherein the system data store comprises at least one data processor, wherein the at least one data processor is in communication with the system processor and receives and services data requests from the system processor.

84. The system of claim 74, wherein the system processor comprises a plurality of processing elements, wherein each of the processing elements runs processes that perform a subset of tasks i) through v) and wherein the union of the subsets of task performed by the processes executing on the plurality of processing elements comprises all tasks i) through v).

85. The system of claim 74, wherein the link is of a type selected from the group consisting of a modem, a serial or parallel interface, a computer network interface, a bus interface and combinations thereof.

86. The system of claim 74, wherein the link further interfaces with a communication channel allowing communication with an employment information source.

87. The system of claim 74, and further comprising a second link to a communication channel allowing communication with an employment information source.

88. The system of claim 74, wherein the system processor performs the further tasks comprising of: vi) providing access to employment law sensitivity materials selected from the group consisting of employer policy statements, employer procedure statements, training materials and combinations thereof to designated agents of employer; vii) monitoring each designated agent's interactions with the employment law sensitivity materials; and viii) storing the monitored interactions in the compliance data store.

89. A computer readable storage environment storing instructions that upon execution by one or more system computers cause the one or more system computers to facilitate compliance with employment laws having varying requirements, and establish such compliance, by performing the steps comprising of:
   a) receiving a request to interact from an agent of an employer, wherein the received interaction request comprises an action indicator corresponding to a selected employment action from a set of employment action specified by an employment law information source external to the employer based upon laws promulgated by a legislature;
   b) providing access to process documentation related to a process associated with the selected employment action, wherein the process is designed to minimize potential for non-compliance with the employment laws, wherein the process documentation guides the agent through the process via interactions between the agent and the process documentation via the user input and output devices, wherein the accessed process documentation is provided and maintained by the employment law information source external to the employer and created by the employment law information source based upon laws promulgated by the legislature;
   c) storing information related to agent interactions with the process documentation in a compliance data store;
   d) generating a compliance report based upon the stored interaction information; and
   e) sending the generated compliance report to one or more report agents of the employer via an output device associate with each.

90. The storage environment of claim 89, wherein the storage environment comprises at least one storage device of a type selected from the group consisting of RAM, ROM, hard disk drive, removable magnetic diskette, optical diskette and combination thereof.

91. The storage environment of claim 90, wherein the storage environment comprises a plurality of storage devices, wherein each of the plurality of storage devices is of a type selected from the group consisting of RAM, ROM, hard disk drive, removable magnetic diskette, optical diskette and combination thereof.

92. The storage environment of claim 89, storing further instructions that upon execution by one or more system computers cause the one or more system computers to perform the steps comprising of: f) providing access to employment law sensitivity materials selected from the group consisting of employer policy statements, employer procedure statements, training materials and combinations thereof to designated agents of employer; g) monitoring each designated agent's interactions with the employment law sensitivity materials; and h) storing the monitored interactions in the compliance data store.

93. A system for facilitating compliance with employment laws having varying requirements, and establishing such compliance, the system comprising:
   a) storage means for at least storing interactions of agents of an employer with process documentation;
   b) linking means for allowing communication with agents of an employer via a communication channel;
   c) processing means in communication with the storage and linking means for:
      i) receiving a request to interact from an agent of an employer, wherein the received interaction request comprises an action indicator corresponding to a selected employment action from a set of employment action specified by an employment law information source external to the employer based upon laws promulgated by a legislature;
      ii) providing access to process documentation related to a process associated with the selected employment action, wherein the process is designed to minimize potential for non-compliance with the employment laws, wherein the process documentation guides the agent through the process via interactions between the agent and the process documentation via the user input and output devices, wherein the accessed process documentation is provided and maintained by the employment law information source external to the employer;
      iii) storing information related to agent interactions with the process documentation in the compliance data store;
      iv) generating a compliance report based upon the stored interaction information; and v) sending the generated compliance report to one or more report agents of the employer via an output device associate with each; and d) receiving means for receiving the process documentation from the employment law information source.

94. The system of claim 93, wherein the processing means is for further vi) providing access to employment law sensitivity materials selected from the group consisting of employer policy statements, employer procedure statements, training materials and combinations thereof to designated agents of employer; vii) monitoring each designated agent's interactions with the employment law sensitivity materials; and viii) storing the monitored interactions in the storage means.

* * * * *

US007330817C1

(12) EX PARTE REEXAMINATION CERTIFICATE (10619th)
United States Patent
Exall et al.

(10) Number: US 7,330,817 C1
(45) Certificate Issued: Jun. 8, 2015

(54) SYSTEM AND METHODS FOR EMPLOYMENT LAW COMPLIANCE, ESTABLISHMENT, EVALUATION AND REVIEW

(75) Inventors: Marian Exall, Atlanta, GA (US); Steven S. Greene, Roswell, GA (US); Fred Rogan, Birmingham, AL (US); Victoria Helms, Atlanta, GA (US); Janet Tomko, Atlanta, GA (US); Tricia Reeks, Atlanta, GA (US); Daniel Paulk, Mableton, GA (US)

(73) Assignee: EMPLOYMENT LAW COMPLIANCE, INC., Atlanta, GA (US)

Reexamination Request:
No. 90/013,180, Mar. 25, 2014

Reexamination Certificate for:
Patent No.: 7,330,817
Issued: Feb. 12, 2008
Appl. No.: 09/929,859
Filed: Aug. 13, 2001

Related U.S. Application Data

(60) Provisional application No. 60/224,836, filed on Aug. 11, 2000.

(51) Int. Cl.
G06Q 99/00 (2006.01)
G06Q 10/00 (2012.01)
G06Q 10/10 (2012.01)
G06Q 30/00 (2012.01)

(52) U.S. Cl.
CPC ............ *G06Q 10/00* (2013.01); *G06Q 10/1053* (2013.01); *G06Q 10/10* (2013.01); *G06Q 30/018* (2013.01)

(58) Field of Classification Search
None
See application file for complete search history.

(56) References Cited

To view the complete listing of prior art documents cited during the proceeding for Reexamination Control Number 90/013,180, please refer to the USPTO's public Patent Application Information Retrieval (PAIR) system under the Display References tab.

*Primary Examiner* — Angela M Lie

(57) ABSTRACT

The present invention is directed to systems and methods for facilitating an employer's compliance with employment laws. A typical system includes a data store for storing compliance information, a processor for supporting compliance functionality and a link to a communication channel allowing communication with one or more agents of an employer. A request to interact is received from an agent indicating a selected employment action. The agent is provided access to process documentation guiding him through a process associated with the selected employment action. The agent's interactions with the process documentation are stored. Compliance reports are generated and sent to appropriate employer agents. Some embodiments may support process documentation development and update. An education facility may be provided in some embodiments.

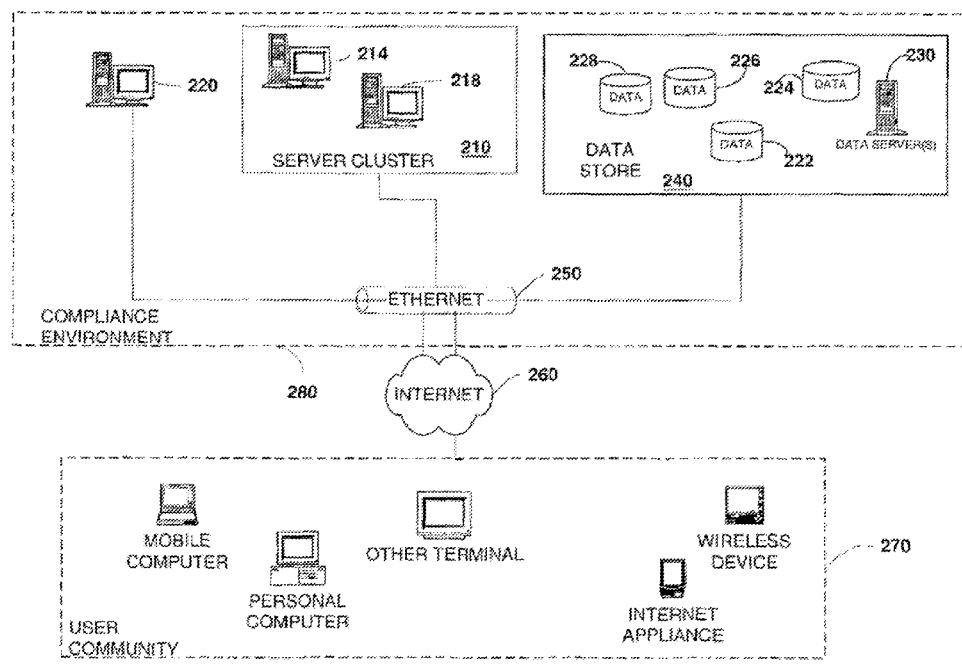

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 44-47 and 50 is confirmed.

Claims 1-43, 48-49 and 51-94 are cancelled.

\* \* \* \* \*

(12) INTER PARTES REVIEW CERTIFICATE (102nd)

United States Patent
Exall et al.

(10) Number: US 7,330,817 K1
(45) Certificate Issued: Sep. 15, 2015

(54) SYSTEMS AND METHODS FOR EMPLOYMENT LAW COMPLIANCE, ESTABLISHMENT, EVALUATION AND REVIEW

(75) Inventors: Marian Exall; Steven S. Greene; Fred Rogan; Victoria Helms; Janet Tomko; Tricia Reeks; Daniel Paulk

(73) Assignee: EMPLOYMENT LAW COMPLIANCE, INC.

Trial Numbers:

IPR2014-00562 filed Apr. 1, 2014
IPR2015-00544 filed Jan. 7, 2015

Petitioners: Alternative Legal Solutions, Inc., dba Compli, Inc.; Hotlinkhr, Inc.; KPA Services, LLC

Patent Owner: Employment Law Compliance, Inc.

Inter Partes Review Certificate for:

Patent No.: 7,330,817
Issued: Feb. 12, 2008
Appl. No.: 09/929,859
Filed: Aug. 13, 2001

The results of IPR2014-00562 and IPR2015-00544 are reflected in this inter partes review certificate under 35 U.S.C. 318(b).

INTER PARTES REVIEW CERTIFICATE
U.S. Patent 7,330,817 K1
Trial No. IPR2014-00562
Certificate Issued Sep. 15, 2015

AS A RESULT OF THE INTER PARTES REVIEW PROCEEDING, IT HAS BEEN DETERMINED THAT:

Claims 1-20, 74-80 and 89-94 are cancelled.

* * * * *